(12) United States Patent
Morse

(10) Patent No.: US 8,314,621 B1
(45) Date of Patent: Nov. 20, 2012

(54) NARROW BAND FILTER

(75) Inventor: Kathleen A. Morse, Groveland, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 324 days.

(21) Appl. No.: 12/855,559

(22) Filed: Aug. 12, 2010

Related U.S. Application Data

(66) Substitute for application No. 61/234,984, filed on Aug. 18, 2009.

(51) Int. Cl.
*G01R 27/32* (2006.01)
(52) U.S. Cl. .............. 324/647; 324/71.1; 324/76.44
(58) Field of Classification Search .......... 324/647, 324/71.1, 76.11, 76.44, 76.49; 356/451, 356/501
See application file for complete search history.

(56) References Cited

U.S. PATENT DOCUMENTS

| | | | |
|---|---|---|---|
| 5,623,339 A * | 4/1997 | Wickramasinghe et al. | 356/501 |
| 2010/0290053 A1 * | 11/2010 | Robinson | 356/451 |

OTHER PUBLICATIONS

Magnusson, R., et al., "New principle for optical filters", Appl. Phys. Lett., Aug. 31, 1992, pp. 1022-1024, vol. 61, No. 9, American Institute of Physics.

* cited by examiner

*Primary Examiner* — Vincent Q Nguyen
(74) *Attorney, Agent, or Firm* — McDermott Will & Emery LLP

(57) ABSTRACT

A unit cell of a narrow band filter is provided. The unit cell includes a matrix body having a first permittivity and an inclusion body having a second permittivity and disposed in the matrix body. The matrix body and the inclusion body are configured to reflect electromagnetic radiation incident on electromagnetic radiation facing surfaces of the matrix body and the inclusion body. A bandwidth of the reflected electromagnetic radiation is based on a difference between the first permittivity and a third permittivity, which is an average permittivity between the first permittivity and the second permittivity based on volumes of the inclusion body and a portion of the matrix body. The inclusion body is configured such that the second permittivity is adjustable to adjust the third permittivity, thereby adjusting the difference between the first permittivity and the third permittivity. A narrow band filter and a method are also disclosed.

20 Claims, 24 Drawing Sheets

NARROW BAND FILTER

CROSS-REFERENCES TO RELATED APPLICATIONS

The present application claims the benefit of U.S. Provisional Patent Application Ser. No. 61/234,984, entitled "TUNABLE NARROW BAND FILTERS," filed on Aug. 18, 2009, which is hereby incorporated by reference in its entirety for all purposes.

STATEMENT AS TO RIGHTS TO INVENTIONS MADE UNDER FEDERALLY SPONSORED RESEARCH OR DEVELOPMENT

Not Applicable.

FIELD

The present invention generally relates to filters and, in particular, relates to tunable narrow band filters.

BACKGROUND

Sampling narrow bands of electromagnetic spectra may help to resolve specific chemical signatures. For example, in Intelligence, Surveillance and Reconnaissance (ISR) missions, systems for detecting, processing, and relaying information from an area (e.g., a warzone) to key decision makers may be slow due to large amounts of information that is collected from satellites and airplanes and that need further processing. The systems may also be slow due to the uncertainty of chemical information collected from the area.

SUMMARY

According to various aspects of the subject technology, a compact tunable narrow band filter (CTNF) is provided and uses a unique metamaterials based versatile technology that may be developed and demonstrated for standoff chemical detection application. In some aspects, a CTNF may offer two orders of magnitude reduction in size, weight, and power compared to typical filter technologies for chemical detection such as Fourier transform infrared spectrometers. The CTNF may offer a high spectral resolution and decreased complexity, can be operated over a wide spectral range, and may be expected to be robust in a field environment. The CTNF can be integrated into multiple platforms and provide accurate chemical information which can greatly reduce the time to identify threats.

According to various aspects of the subject technology, a unit cell of a narrow band filter is provided. The unit cell comprises a matrix body having a first permittivity. The unit cell also comprises an inclusion body disposed in the matrix body, the inclusion body having a second permittivity. The matrix body and the inclusion body are configured to reflect electromagnetic radiation incident on an electromagnetic radiation facing surface of the matrix body and an electromagnetic radiation facing surface of the inclusion body. A bandwidth of the reflected electromagnetic radiation is based on a difference between the first permittivity and a third permittivity. The third permittivity is an average permittivity between the first permittivity and the second permittivity based on a volume of the inclusion body and a volume of a portion of the matrix body. The portion of the matrix body is adjacent to and/or opposite the electromagnetic radiation facing surface of the inclusion body. The inclusion body is configured such that the second permittivity is adjustable to adjust the third permittivity, thereby adjusting the difference between the first permittivity and the third permittivity.

According to various aspects of the subject technology, a narrow band filter is provided and comprises a first unit cell and a rotating member configured to rotate the first unit cell. The first unit cell comprises a first matrix body having a first permittivity. The first unit cell also comprises a first inclusion body disposed in the first matrix body, the first inclusion body having a second permittivity. The first matrix body and the first inclusion body are configured to reflect electromagnetic radiation incident on an electromagnetic radiation facing surface of the first matrix body and an electromagnetic radiation facing surface of the first inclusion body. A bandwidth of the reflected electromagnetic radiation is based on a difference between the first permittivity and a third permittivity. The third permittivity is an average permittivity between the first permittivity and the second permittivity based on a volume of the first inclusion body and a volume of a portion of the first matrix body. The portion of the first matrix body is adjacent to and/or opposite the electromagnetic radiation facing surface of the first inclusion body. The first inclusion body is configured such that the second permittivity is adjustable to adjust the third permittivity, thereby adjusting the difference between the first permittivity and the third permittivity.

According to various aspects of the subject technology, a method is provided. The method comprises reflecting electromagnetic radiation incident on an electromagnetic radiation facing surface of a matrix body of a unit cell of a narrow band filter and an electromagnetic radiation facing surface of an inclusion body of the unit cell of the narrow band filter. The inclusion body is disposed in the matrix body. The matrix body has a first permittivity. The inclusion body has a second permittivity. A bandwidth of the reflected electromagnetic radiation is based on a difference between the first permittivity and a third permittivity. The third permittivity is an average permittivity between the first permittivity and the second permittivity based on a volume of the inclusion body and a volume of a portion of the matrix body. The portion of the matrix body is adjacent to and/or opposite the electromagnetic radiation facing surface of the inclusion body. The method also comprises adjusting the second permittivity of the inclusion body to adjust the third permittivity, thereby adjusting the difference between the first permittivity and the third permittivity.

According to various aspects of the subject technology, a narrow band filter system is provided. The system comprises a narrow band filter which comprises a unit cell. The unit cell comprises a matrix body having a first permittivity. The unit cell also comprises an inclusion body disposed in the matrix body, the inclusion body having a second permittivity. The matrix body and the inclusion body are configured to reflect electromagnetic radiation incident on an electromagnetic radiation facing surface of the matrix body and an electromagnetic radiation facing surface of the inclusion body. A bandwidth of the reflected electromagnetic radiation is based on a difference between the first permittivity and a third permittivity. The third permittivity is an average permittivity between the first permittivity and the second permittivity based on a volume of the inclusion body and a volume of a portion of the matrix body. The portion of the matrix body is adjacent to and/or opposite the electromagnetic radiation facing surface of the inclusion body. The inclusion body is configured such that the second permittivity is adjustable to adjust the third permittivity, thereby adjusting the difference between the first permittivity and the third permittivity. The system also comprises a detector configured to receive the reflected electromagnetic radiation.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

FIG. 4A illustrates a side view of an example of an electric field distribution in the unit cell while FIG. 4B illustrates a corresponding spectral response simulation, in accordance with various aspects of the subject technology.

FIG. 22A illustrates an example of a polarization independent unit cell configuration for the narrow band filter, while

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

According to various aspects of the subject technology, a filter is provided that is based on a two-dimensional photonic crystal class of metamaterials allowing for the patterning of larger feature sizes than allowed by other classes of metamaterials and relaxing some constraints on fabrication tolerances. A suite of commercial electromagnetics (EM) codes may incorporate precisely measured constituent material properties.

Figure 1:
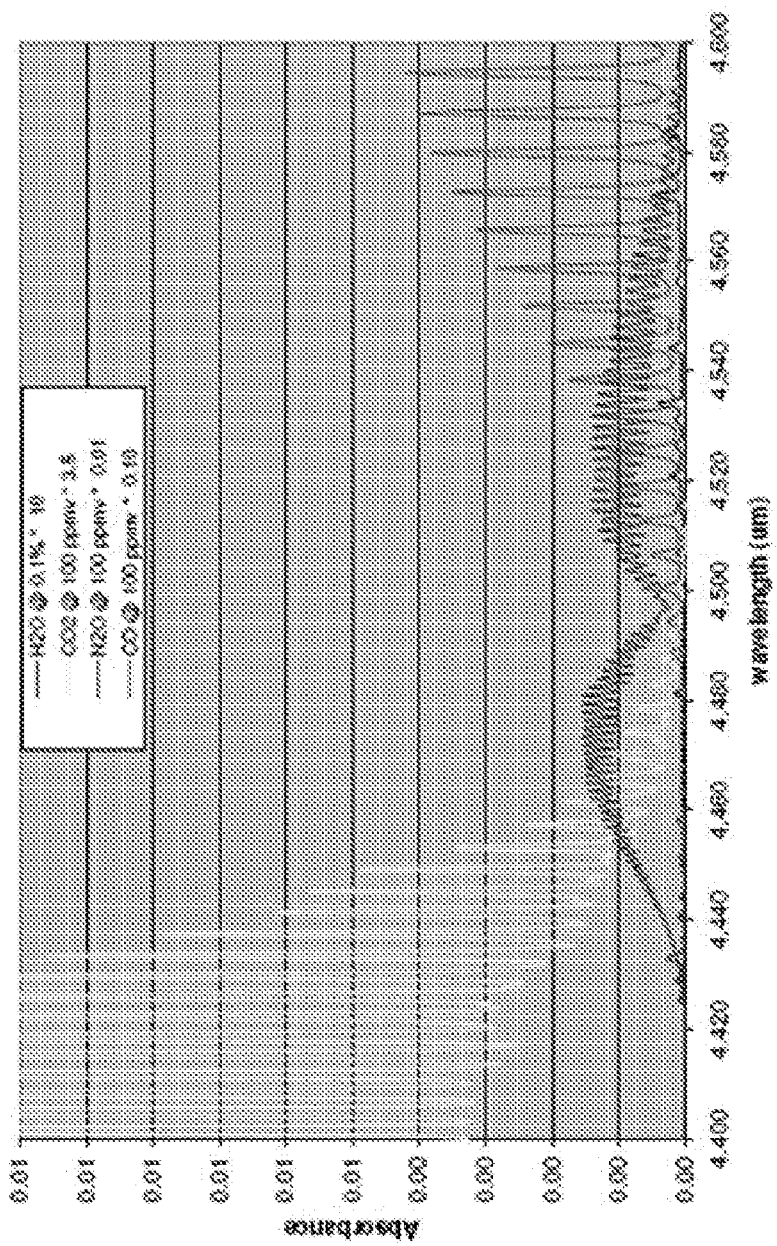
FIG. 1 illustrates an example of a portion of the electromagnetic spectrum that a narrow band filter may be applied to for detecting certain chemical species, in accordance with various aspects of the subject technology.

FIG. 1 illustrates an example of a portion of the electromagnetic spectrum that a narrow band filter may be applied to for detecting certain chemical species, in accordance with various aspects of the subject technology. In some aspects, by tuning or sweeping over limited frequency ranges with a narrow band filter, overlapping chemical species may be detected and quantified. For example, sampling information at a 10 nanometer (nm) bandwidth or less in the mid-infrared region of the electromagnetic spectrum may be beneficial in distinguishing between $N_2O$ and $CO$ and $CO_2$.

Figure 2:
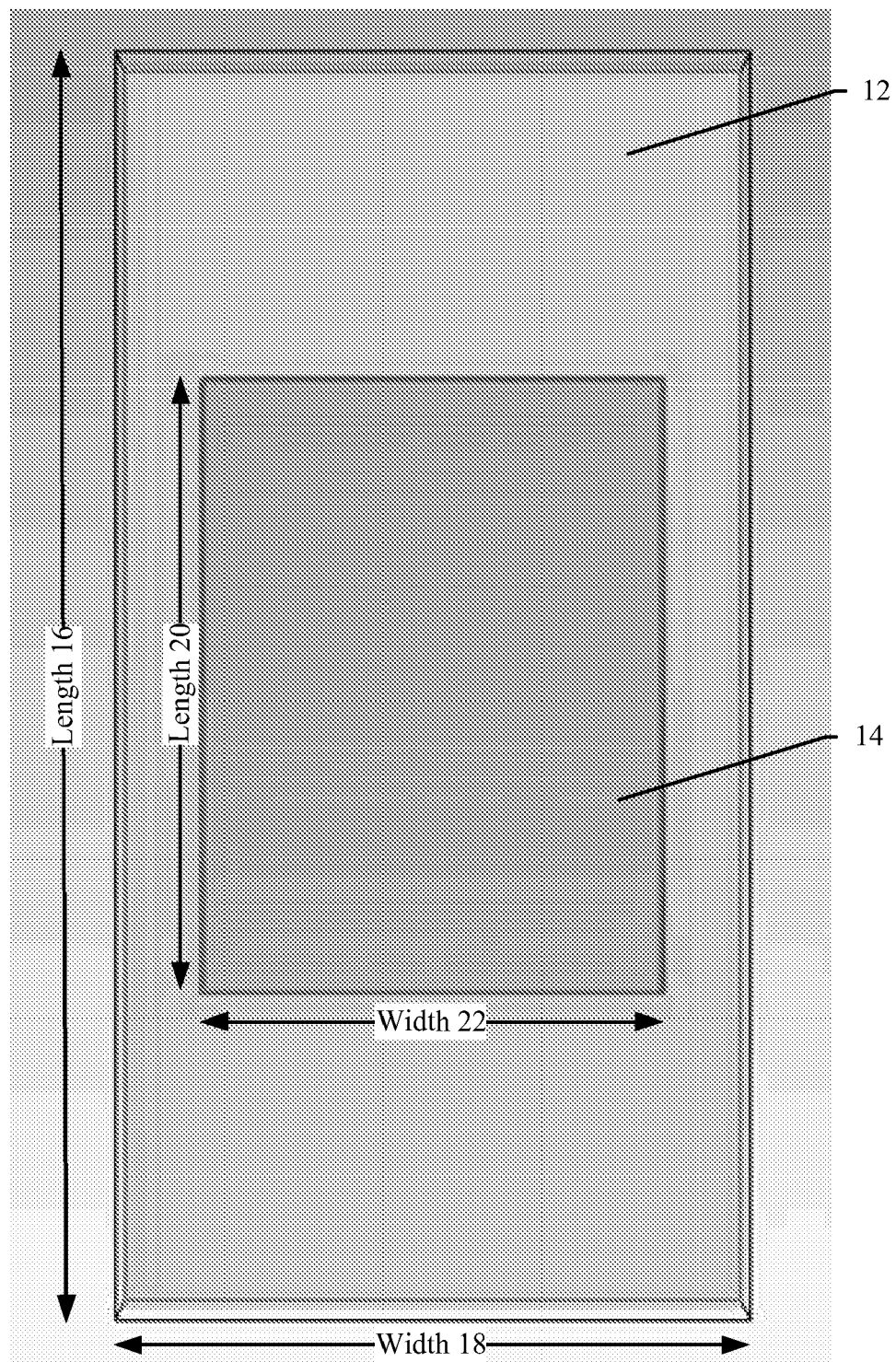
FIG. 2 illustrates an example of a unit cell of a narrow band filter, in accordance with various aspects of the subject technology.

FIG. 2 illustrates an example of a unit cell 10 of a narrow band filter, in accordance with various aspects of the subject technology. Unit cell 10 comprises matrix body 12 having a first permittivity. Unit cell 10 also comprises inclusion body 14 disposed in matrix body 12 and having a second permittivity. An electromagnetic radiation facing surface (ERFS) of matrix body 12 is the surface of matrix body 12 shown in FIG. 2, and the ERFS of inclusion body 14 is the surface of inclusion body 14 shown in FIG. 2. Matrix body 12 and inclusion body 14 are configured to reflect electromagnetic radiation incident on the ERFS of matrix body 12 and the ERFS of inclusion body 14. According to various aspects of the subject technology, the second permittivity of inclusion body 14 may be adjusted in order to determine specific ranges of electromagnetic radiation that is reflected by unit cell 10, thereby enabling unit cell 10 to operate as a filter of electromagnetic radiation. For example, in some aspects, a bandwidth of the reflected electromagnetic radiation is based on a difference between the first permittivity and a third permittivity. The third permittivity may be an average permittivity between the first permittivity and the second permittivity based on a volume of inclusion body 14 and a volume of a portion of matrix body 12. For example, if the volume of inclusion body 14 were equal to the volume of the portion of matrix body 12, then the third permittivity may simply be the average permittivity between the first permittivity and the second permittivity. In some aspects, the third permittivity may be defined by the rule of mixtures of permittivity of inclusion body 14 and the portion of matrix body 12.

In some aspects, the portion of matrix body 12 is adjacent to and/or opposite the ERFS of inclusion body 14 (e.g., the portion of matrix body 12 behind and/or in front of inclusion body 14 in which electromagnetic radiation may be transmitted through in addition to being transmitted through inclusion body 14). In some aspects, being adjacent to inclusion body 14 does not necessarily mean that the portion of matrix body 12 is in direct contact with inclusion body 14, but may also mean other structures may be between inclusion body 14 and the portion of matrix body 12. According to certain aspects, inclusion body 14 is configured such that the second permittivity is adjustable to adjust the third permittivity, thereby adjusting the difference between the first permittivity and the third permittivity. In this regard, the bandwidth of the reflected electromagnetic radiation may be adjusted by adjusting the second permittivity and/or the third permittivity.

In some aspects, unit cell 10 may be referred to as a photonic unit cell, which may be repeated in two dimensions (e.g., along a plane of the ERFS of matrix body 12 and the ERFS of inclusion body 14). In some aspects, electromagnetics modeling tools may be used to down-select materials for matrix body 12 and/or inclusion body 14 and define fabrication tolerances for optimum filter performance. Simulations show that filter performance may be sensitive to material loss. In some aspects, for optimum performance, matrix body 12 uses a loss of better than $2.5 \times 10^{-5}$. In some aspects, matrix body 12 may be referred to as a host. In some aspects, matrix body 12 may comprise at least one of zinc selenide (ZnSe), zinc sulfide (ZnS), germanium, and other suitable materials with sufficiently low loss values. For example, absorption calorimetry of sputtered deposited ZnSe films indicates the upper bounds for loss is $6.5 \times 10^{-6}$ at a 1.064 micron thickness, making this an optimum thin film material to be integrated into the narrow band filter.

In some aspects, inclusion body 14 may be referred to as a block. In some aspects, inclusion body 14 may comprise at least one of silicon dioxide, aluminum oxide, and other suitable materials with sufficiently low absorption values. In some aspects, inclusion body 14 may comprise a liquid crystal material. The liquid crystal material may have a loss value of $1 \times 10^{-6}$ and may be invariant even with changes in the second permittivity, making it an ideal material for the narrow band filter. Absorption calorimetry may be used to evaluate optimum materials for the narrow band filter.

According to various aspects of the subject technology, the dimensions of unit cell 10 may determine the range of frequencies at which the electromagnetic radiation is reflected. In some aspects, inclusion body 14 is disposed within a cavity of matrix body 12. In some aspects, the ERFS of inclusion body 14 is aligned with the ERFS of matrix body 12. In some aspects, the length 20 and width 22 of the ERFS of inclusion body 14 and the length 16 and width 18 ERFS of matrix body 12 may be varied to determine the range of frequencies at which the electromagnetic radiation is reflected.

Figure 3B:
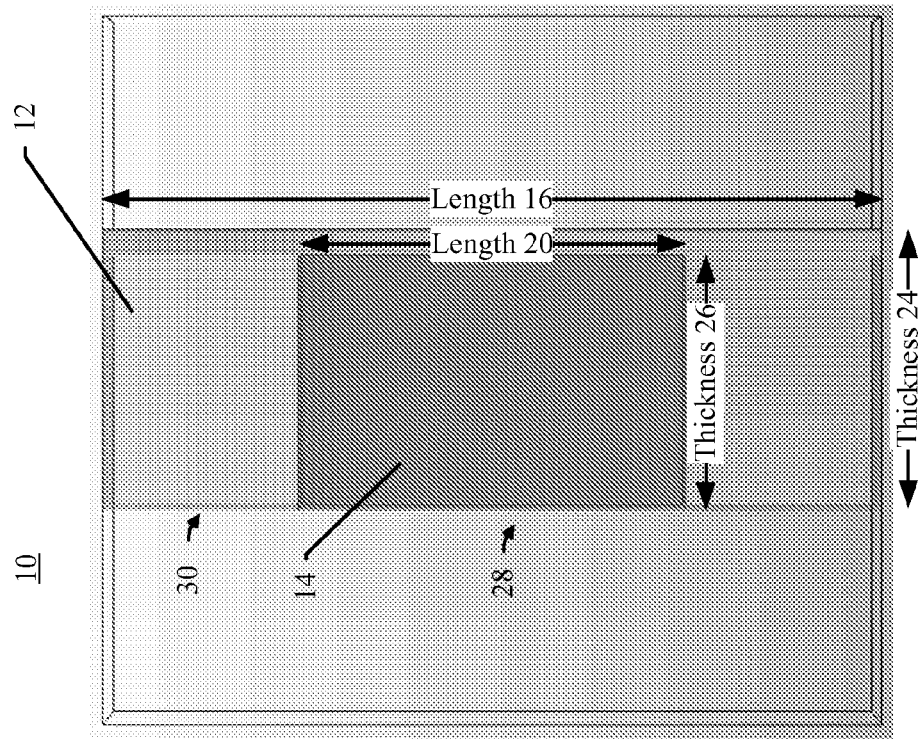
FIGS. 3A and 3B illustrate side views of a unit cell, in accordance with various aspects of the subject technology.
Figure 3A:
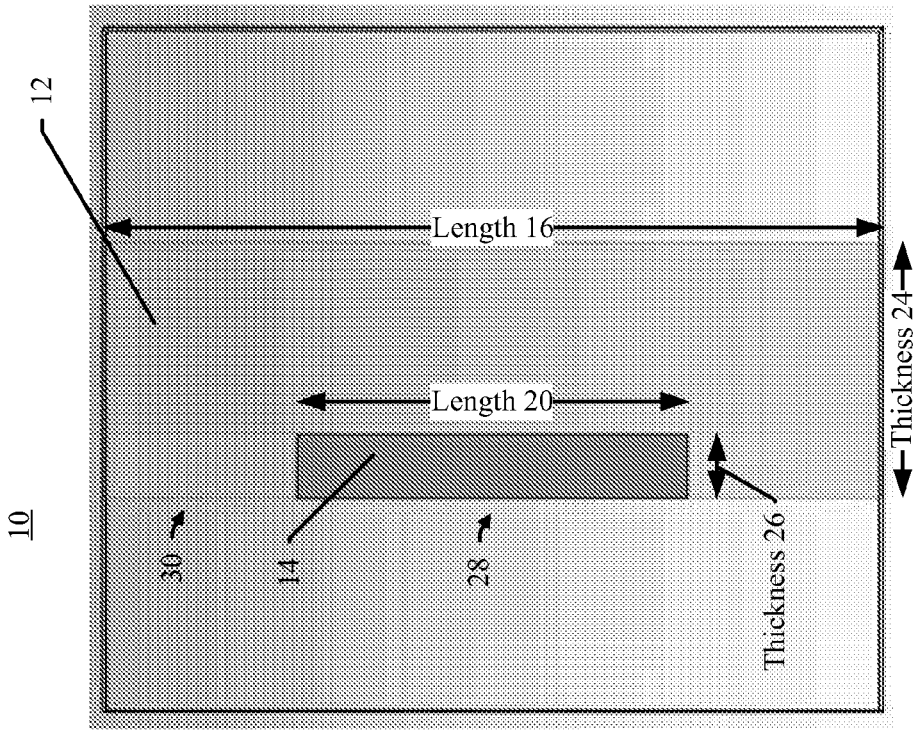

For example, the reflected electromagnetic radiation may be within an infrared portion of the electromagnetic spectrum. Thus, an average length 20 of the ERFS of inclusion body 14 may be between about 1.52 microns and about 1.77 microns. An average width 22 of the ERFS of inclusion body 14 may be between about 1.14 microns and about 1.52 microns. In some aspects, an average length 16 of the ERFS of matrix body 12 may be between about 3.04 microns and about 3.54 microns. An average width 18 of the ERFS of matrix body 12 may be between about 1.52 microns and about 2.02 microns. FIGS. 3A and 3B illustrate side views of unit cell 10, in accordance with various aspects of the subject technology. An average thickness 26 of inclusion body 14 as measured along an axis perpendicular to ERFS 28 of inclusion body 14 may be between about 250 nm and about 1 micron. An average thickness of matrix body 12 as measured along an axis perpendicular to ERFS 30 of matrix body 12 may be about 1 micron. Unit cell 10, however, is not limited to these dimensions. Unit cell 10 may use other suitable dimensions known to those of ordinary skill in the art depending on a desired range of frequencies at which the electromagnetic radiation is reflected.

Figures 4A, 4B:
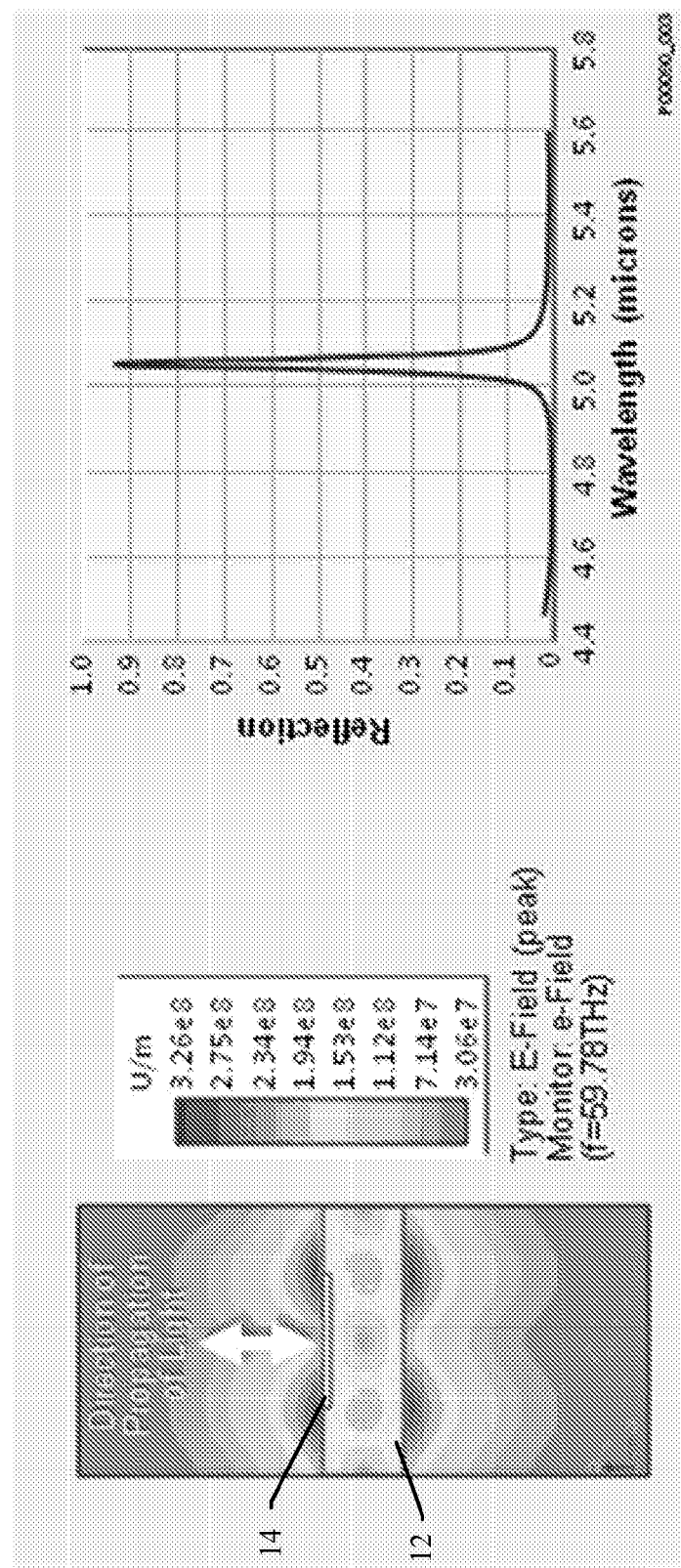

FIG. 4A illustrates a side view of an example of an electric field distribution in unit cell 10 and FIG. 4B illustrates a corresponding spectral response simulation, in accordance with various aspects of the subject technology. In some aspects, an ultra-narrow band reflection response of the narrow band filter relies on the narrow band reflection of electromagnetic radiation of unit cell 10. The narrow band reflection may rely on guided-mode resonance in which the externally propagating diffracted fields are coupled to the waveguide modes of unit cell 10. Such resonances may be strongly confined within unit cell 10, and period contrast of permittivity grating may provide phase matching mechanisms that allow these modes to couple into radiation modes and possess a finite lifetime. Near the resonance frequency, Fano interference may occur and result in complete reflection.

Figure 5:
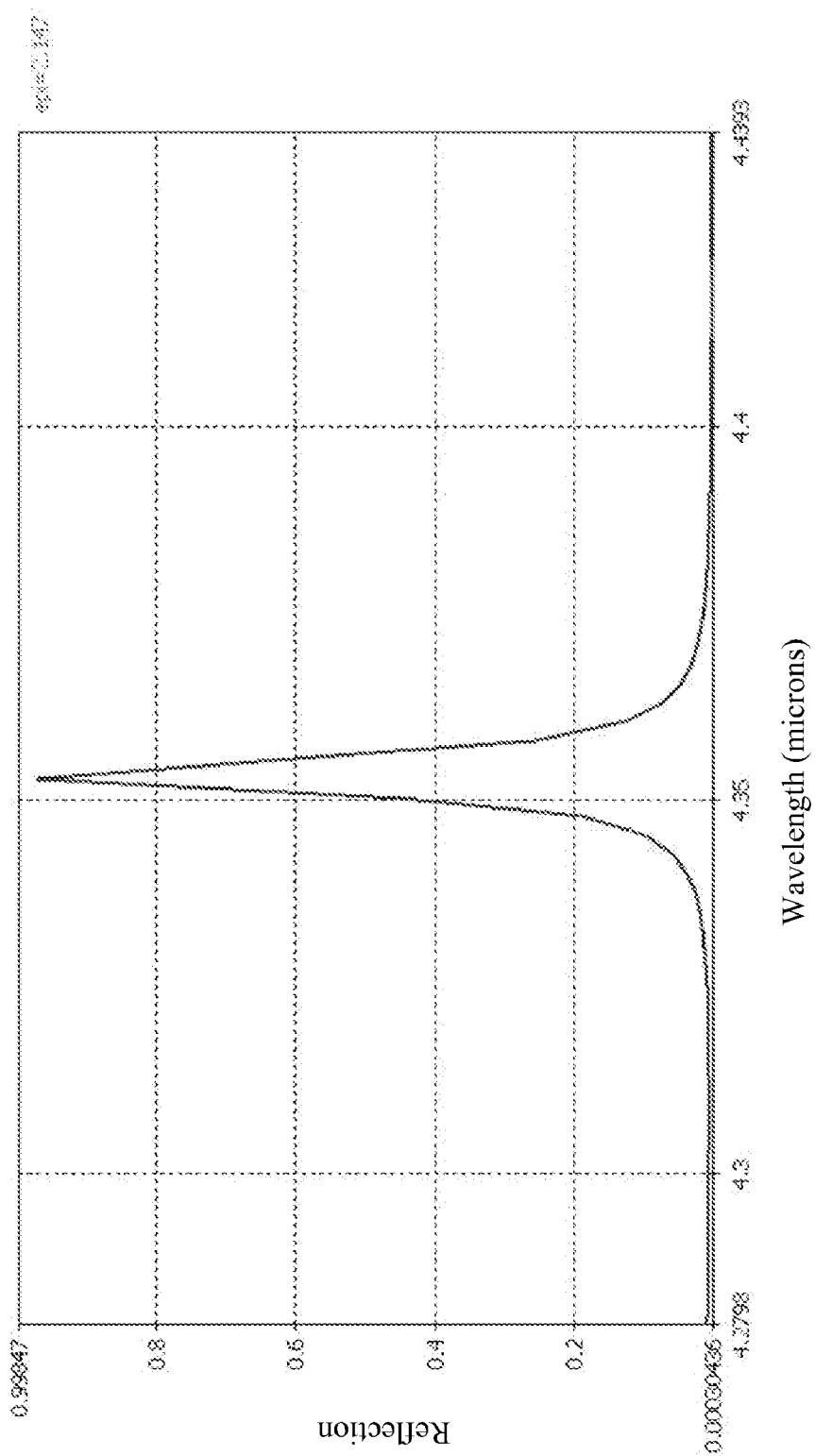
FIG. 5 illustrates an example of a spectral response of the narrow band filter, in accordance with various aspects of the subject technology.
Figure 6:
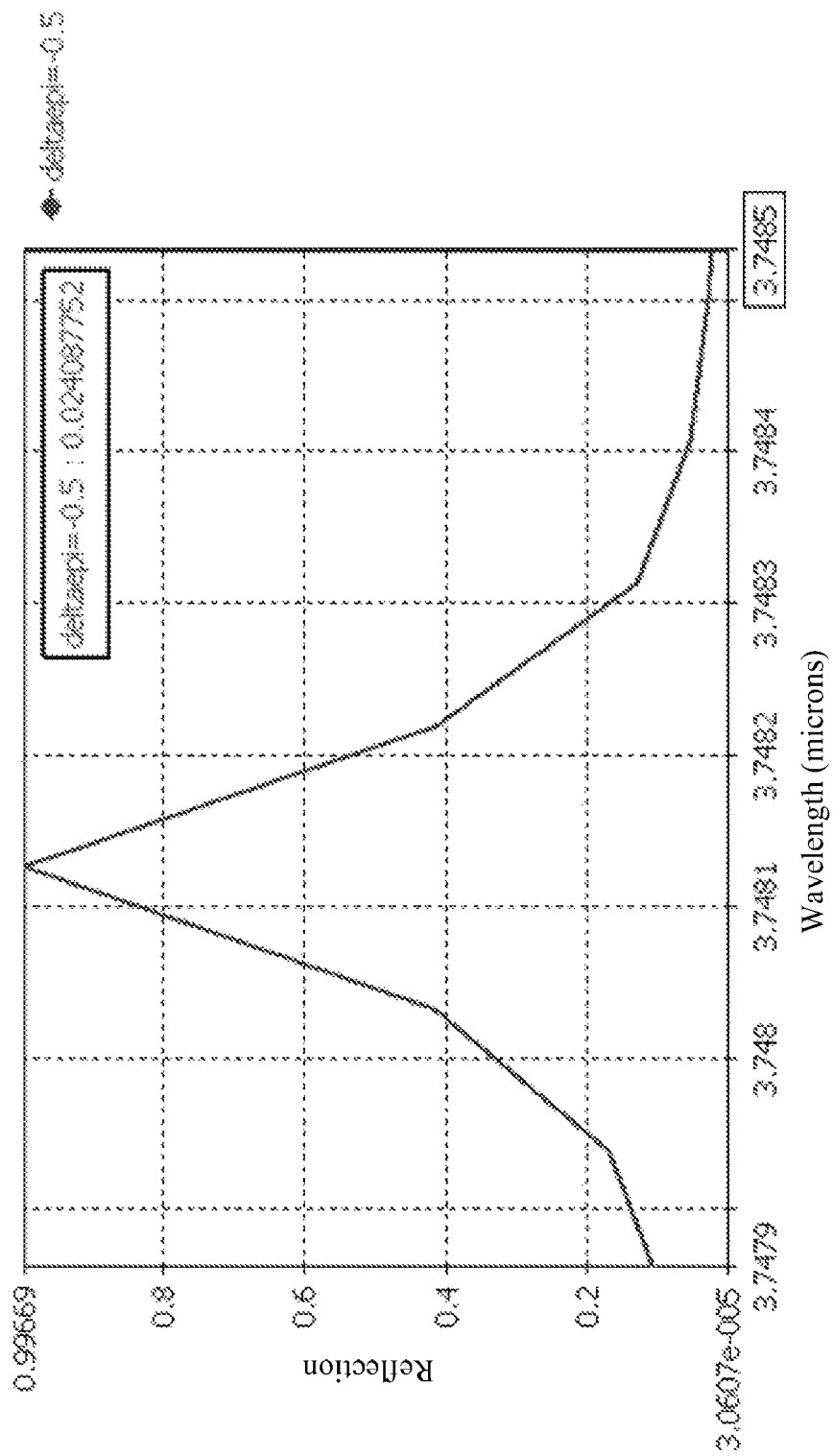
FIG. 6 illustrates an example of a spectral response of the narrow band filter, in accordance with various aspects of the subject technology.

Referring to FIG. 4B, roll-off behavior of the spectral response may be controlled by a thickness of unit cell 10. In some aspects, the spacing between multiple unit cells of the narrow band filter may be used as a way to control filter roll-off. FIG. 5 illustrates an example of a spectral response of the narrow band filter, in accordance with various aspects of the subject technology. As shown, the bandwidth of the reflected electromagnetic radiation at full width at half-maximum (FWHM) is 10 nm. However, unit cell 10 of the narrow band filter may reflect electromagnetic radiation at other suitable bandwidths, such as between 2 Angstroms and 20 nm. In some aspects, a narrow bandwidth may refer to bandwidths between 2 Angstroms and 20 nm. In some aspects, a narrow bandwidth may refer to bandwidths greater than 20 nm. In some aspects, a narrow bandwidth may refer to bandwidths less than 2 Angstroms. FIG. 6 illustrates an example of a spectral response of the narrow band filter, in accordance with various aspects of the subject technology. In this example, the bandwidth of the reflected electromagnetic radiation at FWHM is 2 Angstroms. In this case, an average thickness of inclusion body 14 is 1 nm and an average thickness of matrix body 12 is 1 micron. The permittivity contrast (e.g., the difference between the first permittivity and the second permittivity) is indicated by "deltaepi," which in this example is −0.5.

As noted above, the second permittivity of inclusion body 14 may be adjusted to adjust the third permittivity in order to determine specific ranges of electromagnetic radiation that is reflected by unit cell 10, thereby enabling unit cell 10 to operate as a filter of electromagnetic radiation. For example, in some aspects, a bandwidth of the reflected electromagnetic radiation is based on a difference between the first permittivity and the third permittivity. As discussed above, the third permittivity can be found using the rule of mixtures of permittivity. This approach may result in small permittivity contrasts between inclusion body 14 and matrix body 12.

Figure 7:
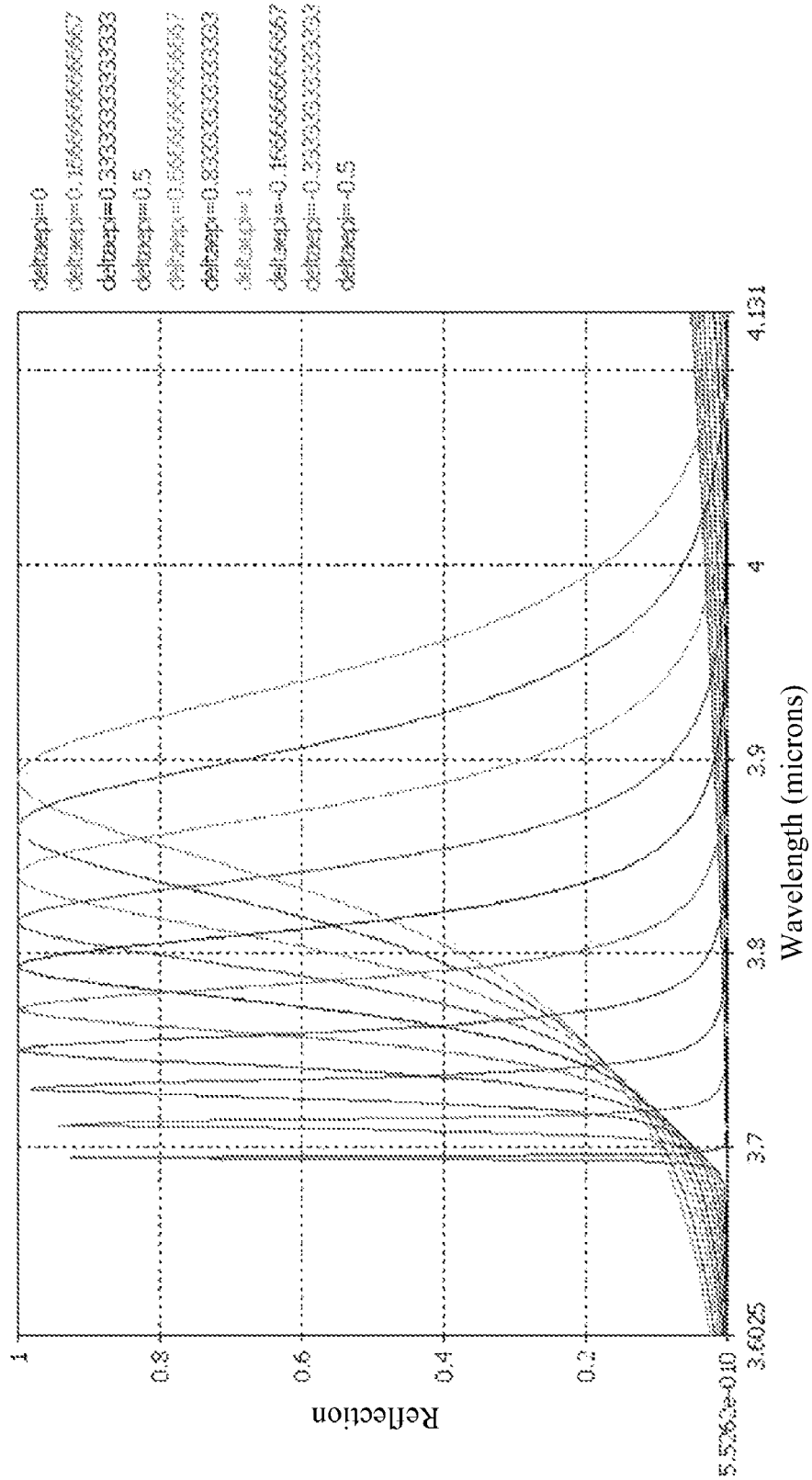
FIGS. 7 and 8 illustrate examples of the spectral responses of the reflected electromagnetic radiation of the unit cell, in accordance with various aspects of the subject technology.
Figure 8:
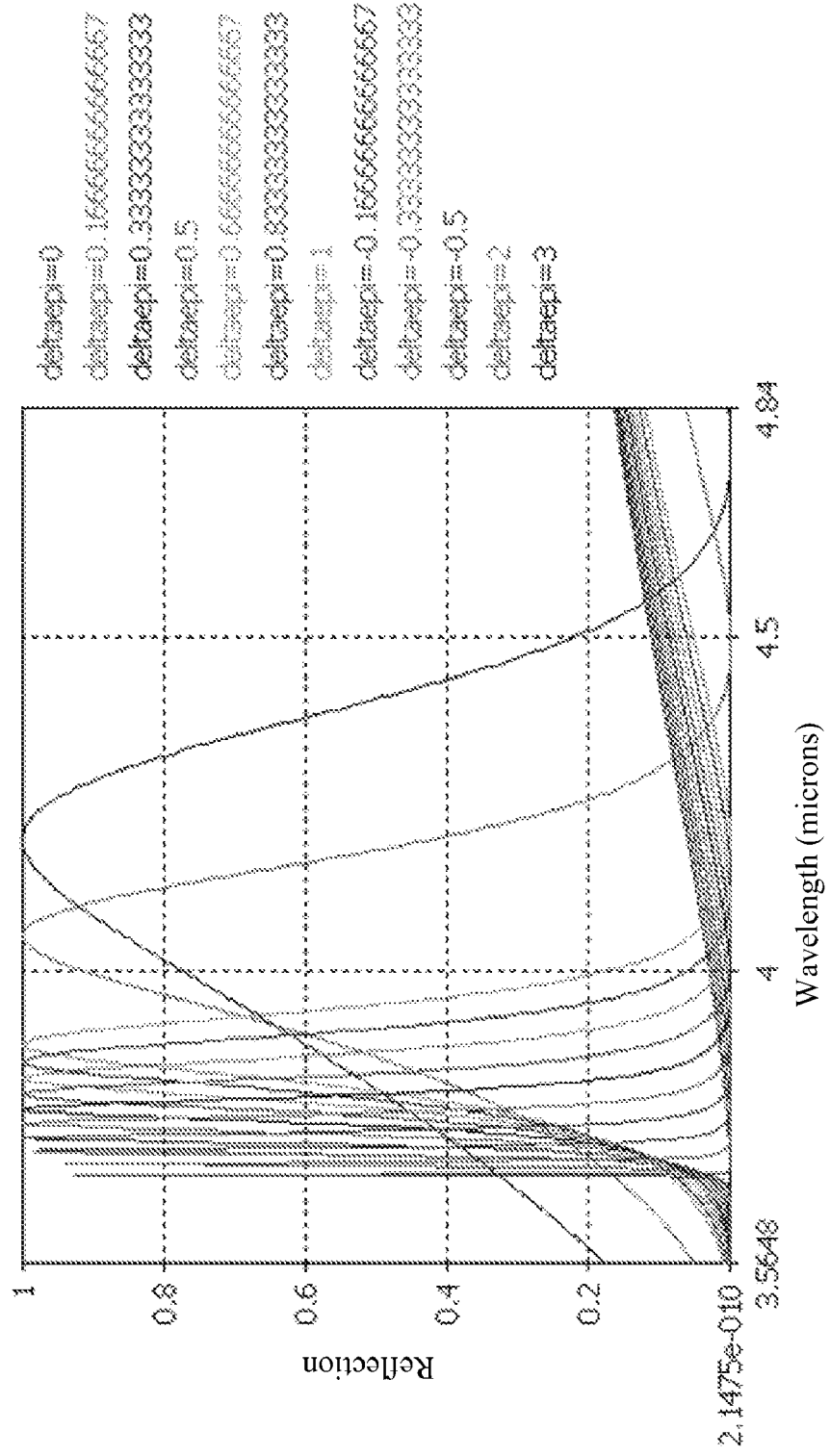

FIGS. 7 and 8 illustrate examples of the spectral responses of the reflected electromagnetic radiation of unit cell 10, in accordance with various aspects of the subject technology. In these examples, the first permittivity (e.g., the permittivity of matrix body 12) is set at an initial value of 3.9, while the second permittivity (e.g., the permittivity of inclusion body 14) is set at an initial value of 2.6. A permittivity contrast value, "deltaepi," is varied and added to the first permittivity while it is subtracted from the second permittivity. Thus, the larger the value of deltaepi, the greater the difference between the first permittivity and the second permittivity (resulting in a greater difference between the first permittivity and the third permittivity). As shown in FIGS. 7 and 8, the smaller the permittivity contrast of the first permittivity and the second permittivity (resulting in a smaller permittivity contrast between the first permittivity and the third permittivity), the narrower the bandwidth of the reflected electromagnetic radiation. Correspondingly, the greater the permittivity contrast of the first permittivity and the second permittivity (resulting in a greater permittivity contrast between the first permittivity and the third permittivity), the broader the bandwidth of the reflected electromagnetic radiation.

According to various aspects of the subject technology, inclusion body 14 is configured such that the second permittivity is adjustable to adjust the third permittivity, thereby adjusting the difference between the first permittivity and the third permittivity. In some aspects, by adjusting the thickness of inclusion body 14 relative to the thickness of matrix body 12, the second permittivity may be adjusted to adjust the third permittivity, thereby adjusting the difference between the first permittivity and the third permittivity. In some aspects, simulations show that as the thickness of inclusion body 14 decreases, the permittivity contrast of the first permittivity and the third permittivity decreases, thereby resulting in narrowing of the bandwidth of the reflected electromagnetic radiation.

Thus, the difference between the first permittivity and the third permittivity is based on a thickness of inclusion body 14 relative to a thickness of matrix body 12. The difference between the first permittivity and the third permittivity is decreased if the thickness of inclusion body 14 is decreased relative to the thickness of matrix body 12, thereby resulting in narrowing the bandwidth of the reflected electromagnetic radiation. The difference between the first permittivity and the third permittivity is increased if the thickness of inclusion body 14 is increased relative to the thickness of matrix body 12, thereby resulting in broadening the bandwidth of the reflected electromagnetic radiation.

Figure 9:
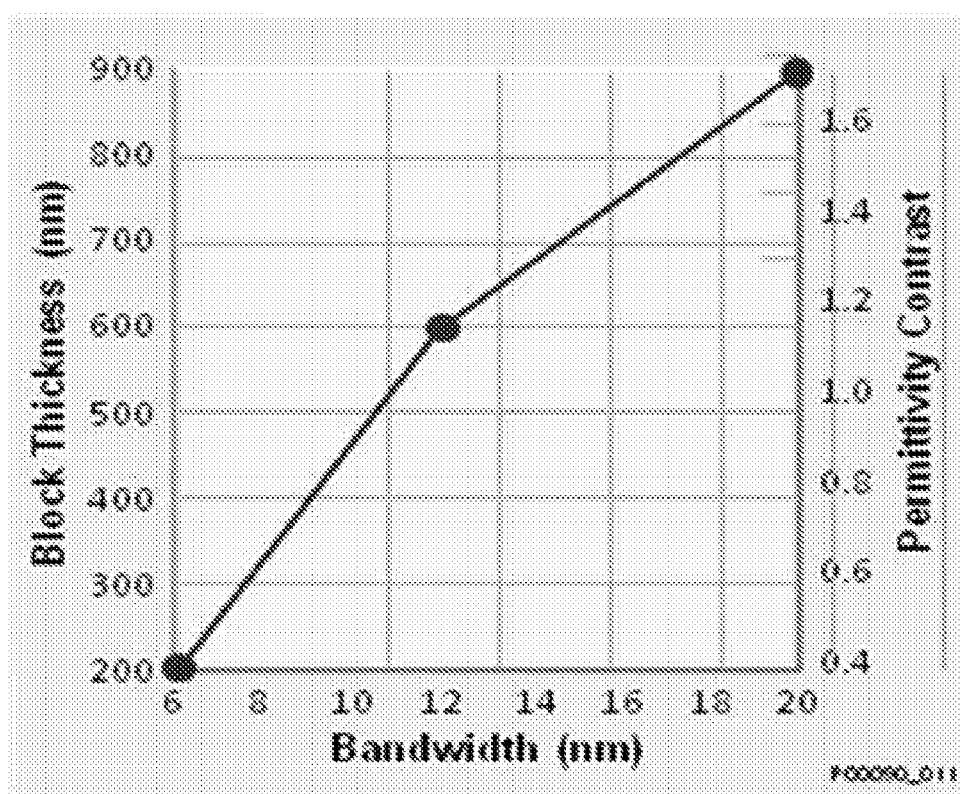
FIG. 9 illustrates an example of a relationship between a thickness of an inclusion body of the unit cell, permittivity contrast of the unit cell, and a bandwidth of the reflected electromagnetic radiation of the unit cell, in accordance with various aspects of the subject technology.

FIG. 9 illustrates an example of a relationship between a thickness of inclusion body 14, permittivity contrast between the first permittivity and the third permittivity, and a bandwidth of the reflected electromagnetic radiation of unit cell 10, in accordance with various aspects of the subject technology. In some aspects, the bandwidth of reflected electromagnetic radiation depends on the permittivity contrast between the first permittivity and the third permittivity, and the amplitude of this contrast may be directly proportional to the bandwidth of the reflected electromagnetic radiation.

Figure 10:
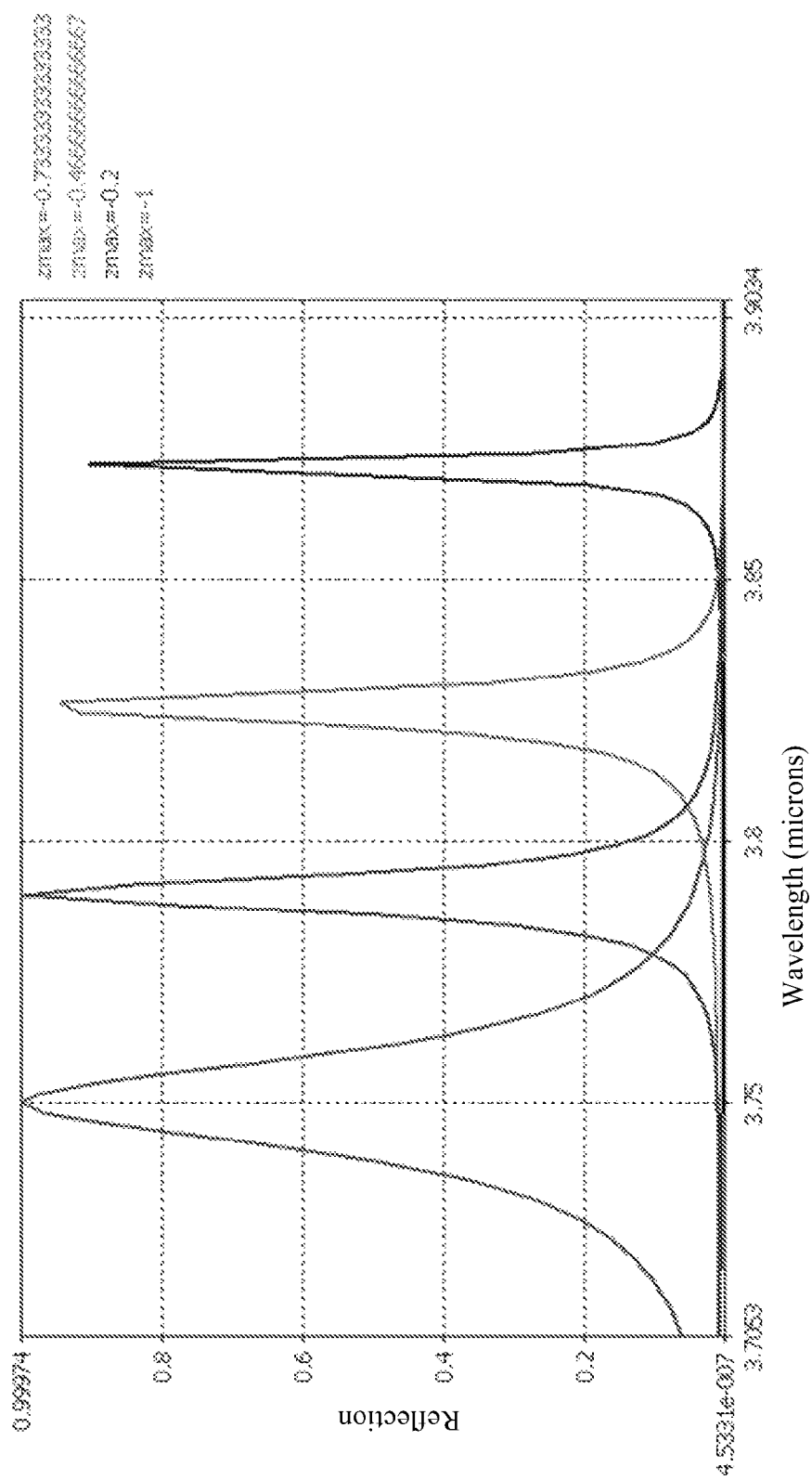
FIG. 10 illustrates examples of the spectral response of the reflected electromagnetic radiation of the unit cell, in accordance with various aspects of the subject technology.

FIG. 10 illustrates examples of the spectral response of the reflected electromagnetic radiation of unit cell 10, in accordance with various aspects of the subject technology. The thickness of inclusion body 14 is indicated by "zmax," with units in microns. In these examples, the thickness of matrix body 12 is 1 micron. As shown in FIG. 10, as the thickness of inclusion body 14 decreases, the bandwidth of the reflected electromagnetic radiation becomes narrower.

Figure 11:
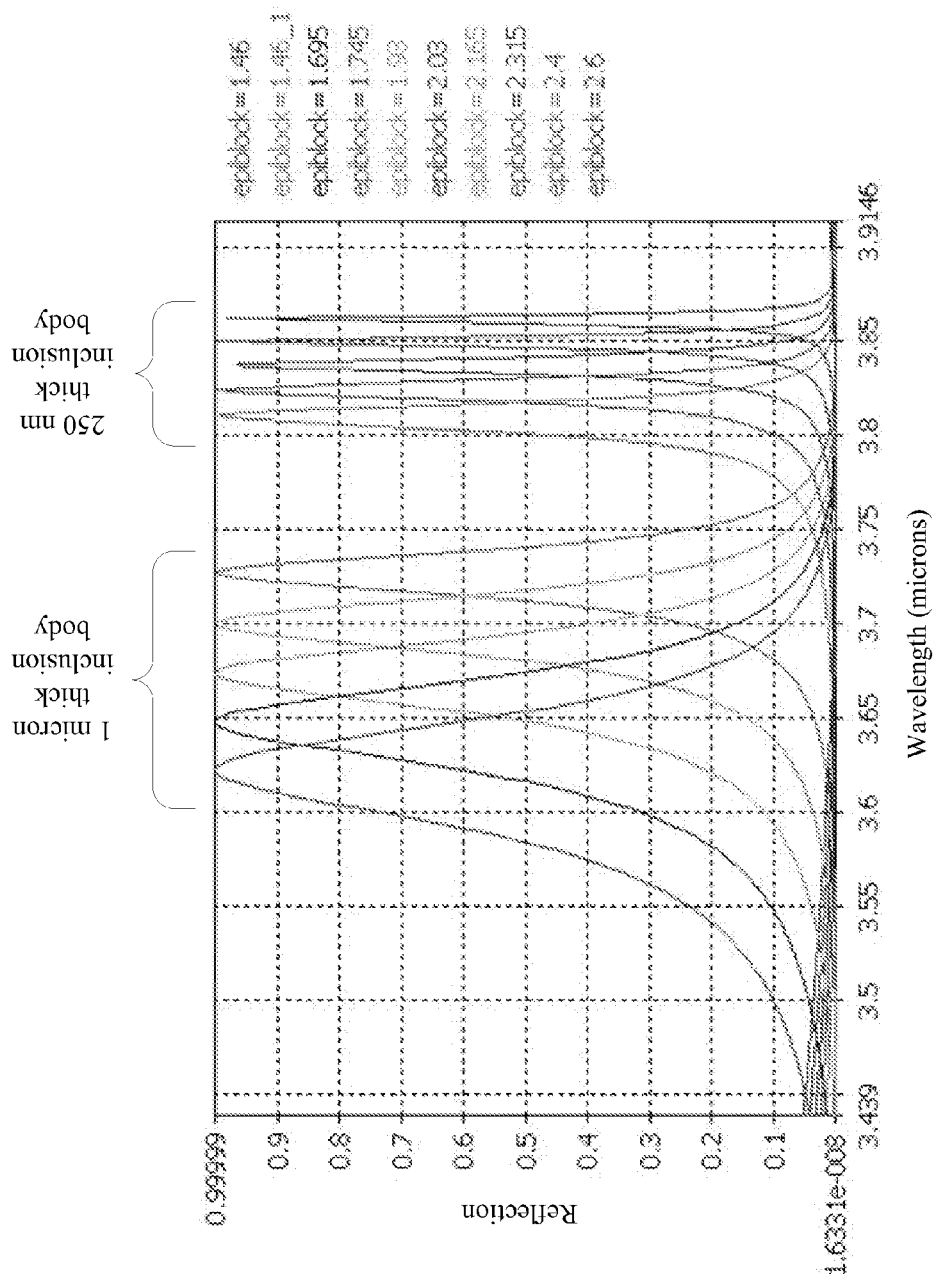
FIG. 11 illustrates examples of the spectral response of the reflected electromagnetic radiation of the unit cell, in accordance with various aspects of the subject technology.

FIG. 11 illustrates examples of the spectral response of the reflected electromagnetic radiation of unit cell 10, in accordance with various aspects of the subject technology. In these examples, length 20 of inclusion body 14 is 1.52 microns, width 22 of inclusion body 14 is 1.14 microns, length 16 of matrix body 12 is 3.04 microns, and width 18 of matrix body 12 is 1.52 microns. As shown in FIG. 11, thickness 26 of inclusion body 14 at 1 micron results in a broader bandwidth of the reflected electromagnetic radiation compared to the bandwidth of the reflected electromagnetic radiation when thickness 26 of inclusion body 14 is 250 nm. Furthermore, the second permittivity of inclusion body 14 is indicated by "epiblock." As shown in FIG. 11, by varying the second permittivity to vary the third permittivity, the bandwidth of the reflected electromagnetic radiation is also adjusted accordingly.

Figure 12:
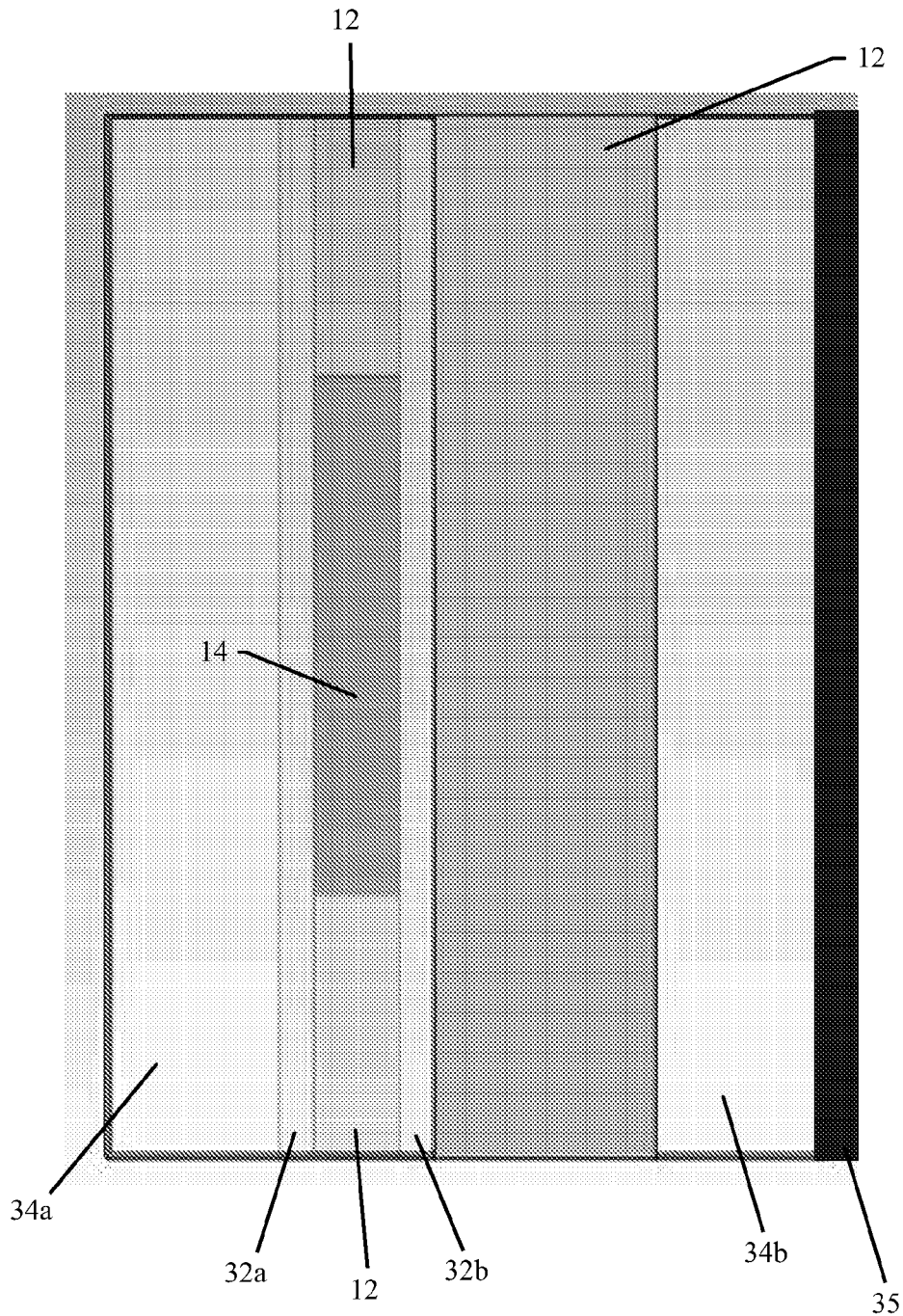
FIG. 12 illustrates a side view of the unit cell, in accordance with various aspects of the subject technology.

According to various aspects of the subject technology, the second permittivity of unit cell 10 may be adjusted (thereby adjusting the third permittivity) by applying a voltage difference across inclusion body 14. The second permittivity may be a function of the amplitude of the voltage applied across inclusion body 14. FIG. 12 illustrates a side view of unit cell 10, in accordance with various aspects of the subject technology. Unit cell 10 comprises electrodes 32a and 32b. Inclusion body 14 is disposed between electrodes 32a and 32b. In some aspects, inclusion body 14 comprises a liquid crystal. In some aspects, the second permittivity is based on an amount of voltage (e.g., amplitude of voltage) applied across inclusion body 14 with electrodes 32a and 32b. For example, a 1 kilohertz alternating current (AC) square wave bias may be applied across inclusion body 14. In some aspects, electrodes 32a and 32b are transparent and are mid-wave infrared electrodes. However, electrodes 32a and 32b may be other suitable electrodes known to those of ordinary skill in the art.

According to certain aspects, the third permittivity may be decreased if the amount of voltage applied across inclusion body 14 with electrodes 32a and 32b is increased. In one example, the first permittivity may be greater than the third permittivity when no voltage is applied across inclusion body 14. Thus, the difference between the first permittivity and the third permittivity may be increased if the amount of voltage applied across inclusion body 14 with electrodes 32a and 32b is increased, thereby resulting in broadening the bandwidth of the reflected electromagnetic radiation. The difference between the first permittivity and the third permittivity may be decreased if the amount of voltage applied across inclusion body 14 with electrodes 32a and 32b is decreased, thereby resulting in narrowing the bandwidth of the reflected electromagnetic radiation. Although the first permittivity is greater than the third permittivity when no voltage is applied across inclusion body 14 in this example, other suitable configurations may be used (e.g., the first permittivity may be equal or may be less than the third permittivity when no voltage is applied).

In some aspects, unit cell 10 comprises substrates 34a and 34b to support the structure of unit cell 10. Electrodes 32a and 32b, inclusion body 14, and the matrix body 12 are disposed between substrates 34a and 34b. In some aspects, substrates 34a and 34b are transparent. In some aspects, substrates 34a and 34b comprise germanium, ZnSe, ZnS, or other suitable transmissive material. In some aspects, unit cell 10 comprises absorber coating 35 coupled to substrate 34b. Absorber coating 35 may be used to avoid extraneous reflection from a backside of unit cell 10 and absorb transmitted electromagnetic radiation.

Figure 13:
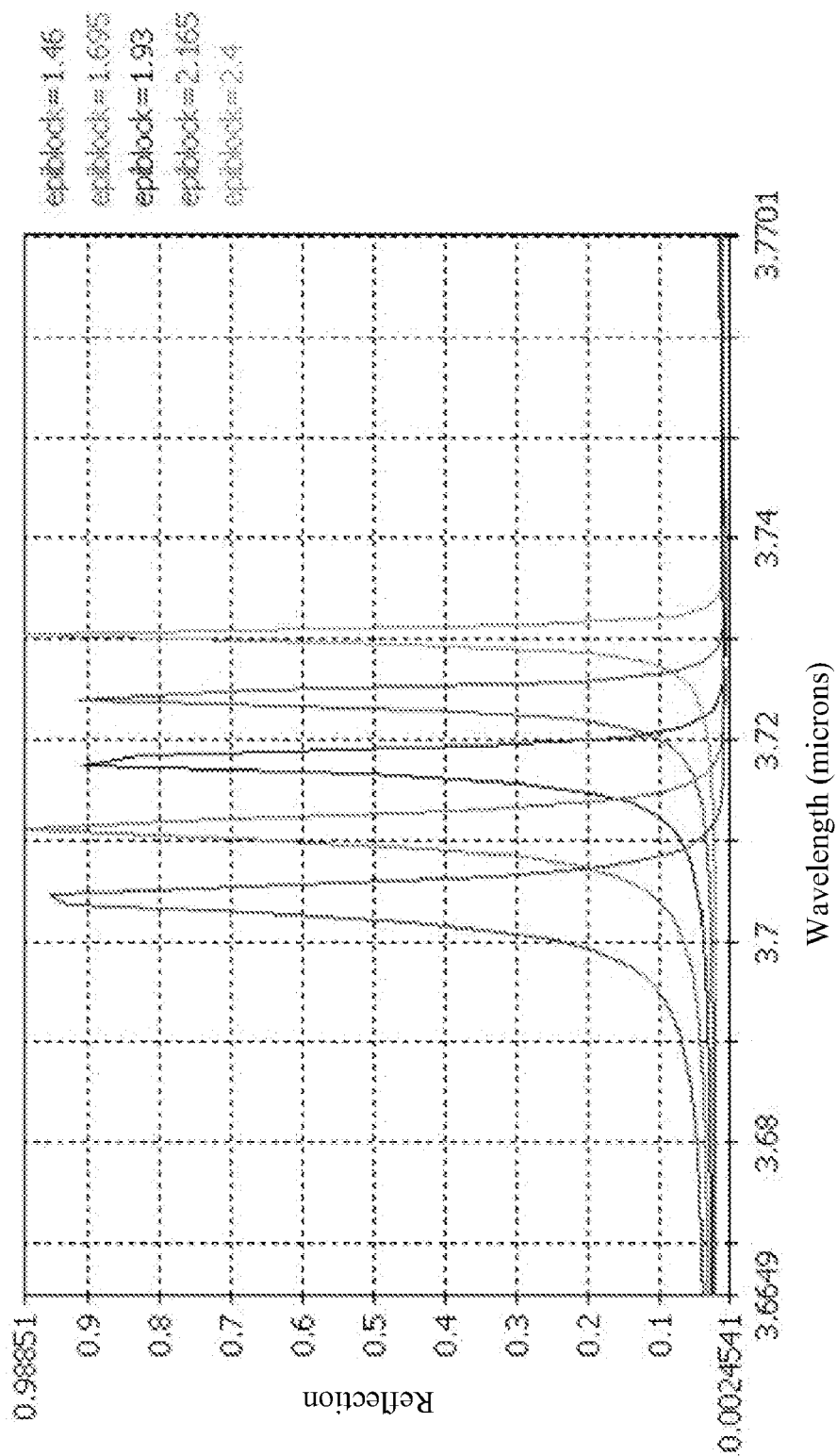
FIGS. 13 and 14 illustrate examples of the spectral response of the reflected electromagnetic radiation of the unit cell, in accordance with various aspects of the subject technology.
Figure 14:
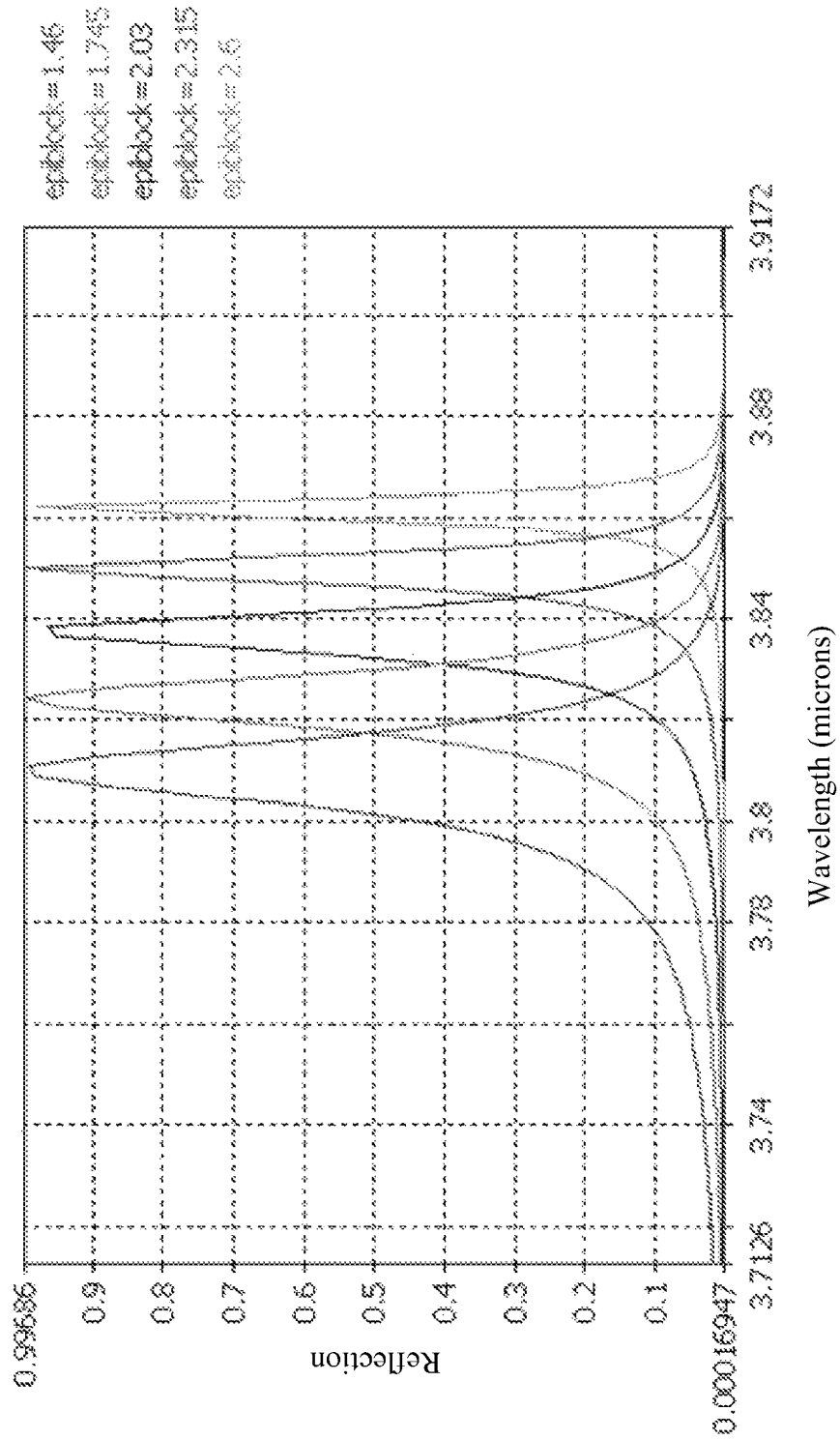

FIGS. 13 and 14 illustrate examples of the spectral response of the reflected electromagnetic radiation of unit cell 10, in accordance with various aspects of the subject technology. As shown in these figures, the bandwidth of the reflected electromagnetic radiation is adjusted depending on the value of the second permittivity, as indicated by epiblock. In an example where the first permittivity is greater than the second permittivity when no voltage is applied across inclusion body 14, as the second permittivity obtains a higher value (the third permittivity also obtains a higher value), the permittivity contrast between the first permittivity and the third permittivity is decreased, thereby resulting in narrowing the bandwidth of the reflected electromagnetic radiation.

According to various aspects of the subject technology, a center of wavelength of the reflected electromagnetic radiation of unit cell 10 may also be adjusted or tuned. In some aspects, a liquid crystal may be placed in front of ERFS 28 of inclusion body 14 and ERFS 30 of matrix body 12. In some aspects, the effective permittivity of this liquid crystal may be modulated by applying a voltage across it. Thus, the wavelength at which Fano interference occurs is also shifted, thereby shifting the center of wavelength of the reflected electromagnetic radiation. For example, unit cell 10 may be made to resonate in the 2 to 7 micron range and beyond.

Figure 15:
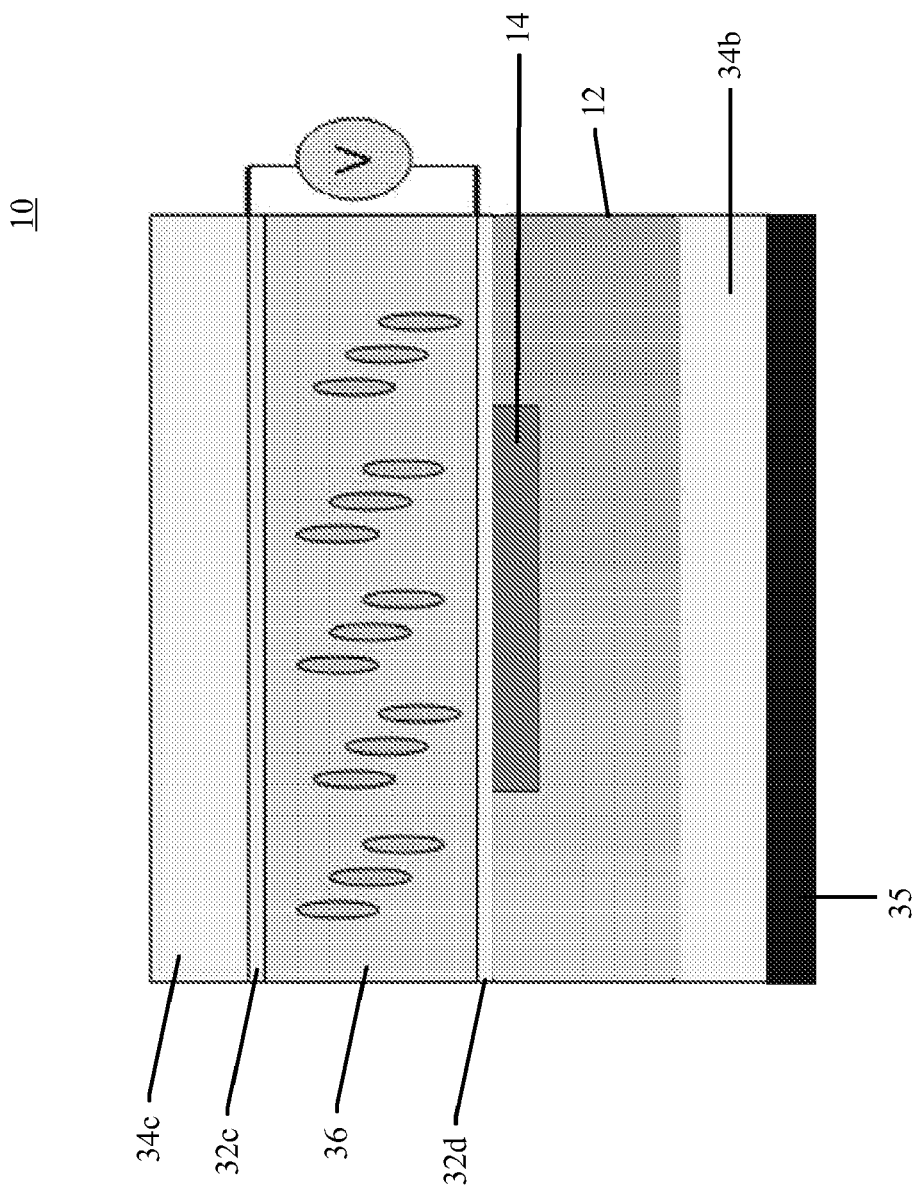
FIG. 15 illustrates an example of the unit cell configured such that the center of wavelength of reflection may be adjusted, in accordance with various aspects of the subject technology.

FIG. 15 illustrates an example of unit cell 10 configured such that the center of wavelength of reflection may be adjusted, in accordance with various aspects of the subject technology. Unit cell 10 comprises liquid crystal 36 coupled to matrix body 12 and inclusion body 14. Liquid crystal 36, for example, may be a 1 micron thick layer of liquid crystal material. However, liquid crystal 36 may be configured in other suitable sizes known to those of ordinary skill in the art. Unit cell 10 also comprises electrodes 32c and 32d. Liquid crystal 36 is disposed between electrodes 32c and 32d. In some aspects, electrodes 32c and 32d are transparent and are mid-wave infrared electrodes. However, electrodes 32a and 32b may be other suitable electrodes known to those of ordinary skill in the art. In some aspects, unit cell 10 comprises absorber coating 35 coupled to substrate 34b. Absorber coating 35 may be used to avoid extraneous reflection from a backside of unit cell 10 and absorb transmitted electromagnetic radiation.

In some aspects, the center of wavelength of the reflected electromagnetic radiation is based on the effective permittivity of liquid crystal 36, which is based on an amount of voltage (e.g., amplitude of voltage) applied across liquid crystal 36 with electrodes 32c and 32d. For example, a 1 kilohertz square wave may be applied across liquid crystal 36, having an amplitude which may be adjusted (e.g., from 0.1 volts to 10 volts) to adjust the amount of voltage applied across liquid crystal 36. In some aspects, the center of wavelength of the reflected electromagnetic radiation is increased if the effective permittivity of liquid crystal 36 is increased (which can be achieved by decreasing the amount of voltage applied across liquid crystal 36 with electrodes 32c and 32d). In some aspects, the center of wavelength of the reflected electromagnetic radiation is decreased if the effective permittivity of liquid crystal 36 is decreased (which can be achieved by increasing the amount of voltage applied across liquid crystal 36 with electrode 32c and 32d).

In some aspects, unit cell 10 further comprises substrate 34c to support the structure of unit cell 10. Electrodes 32c and 32d, liquid crystal 36, inclusion body 14, and matrix body 12 are disposed between substrates 34c and 34b. In some aspects, substrate 34c is transparent. In some aspects, substrates 34c comprises germanium, ZnSe, ZnS, or other suitable transmissive material.

Figure 16:
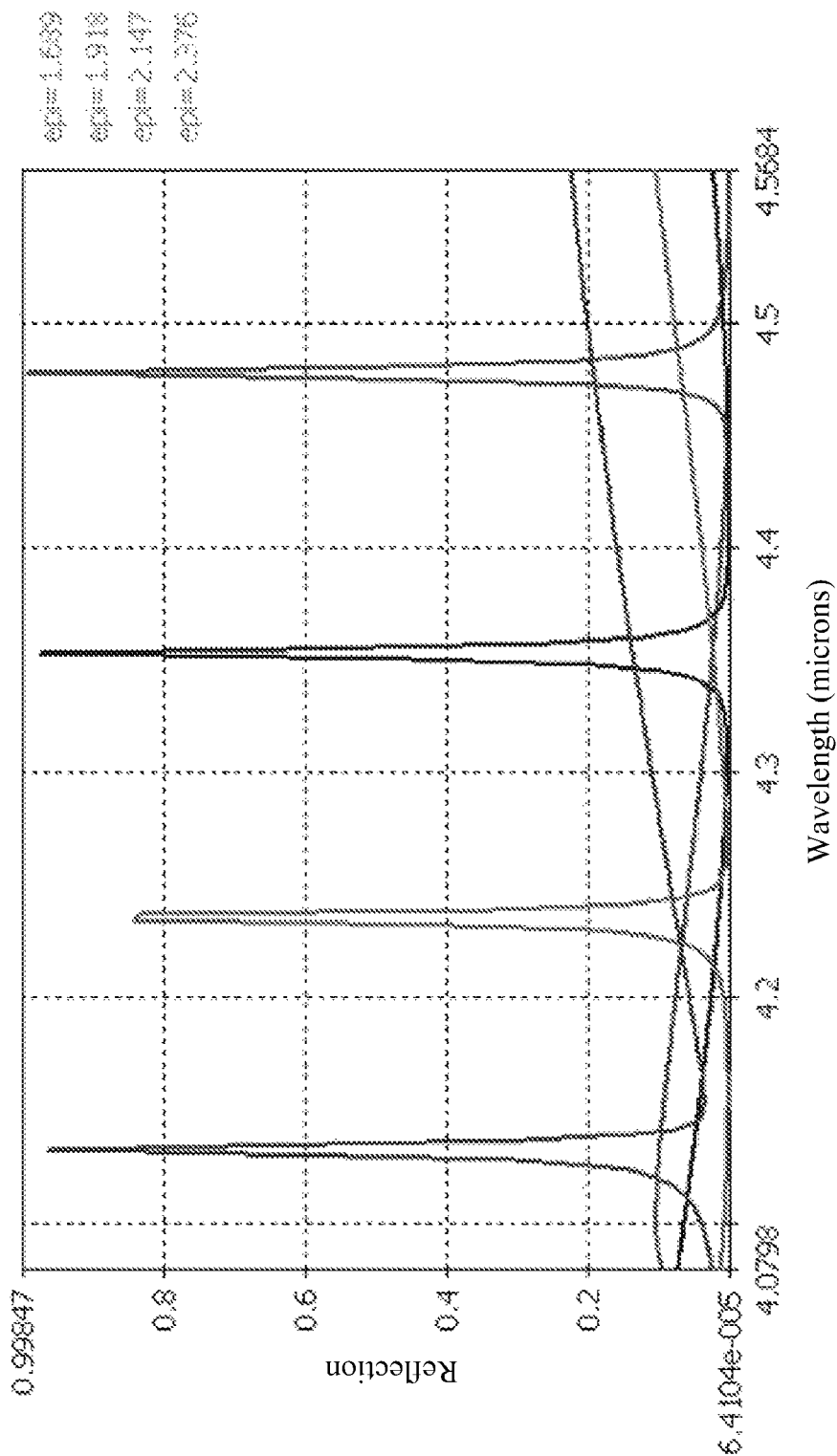
FIGS. 16 and 17 illustrate examples of the spectral response of the reflected electromagnetic radiation of the unit cell, in accordance with various aspects of the subject technology.
Figure 17:
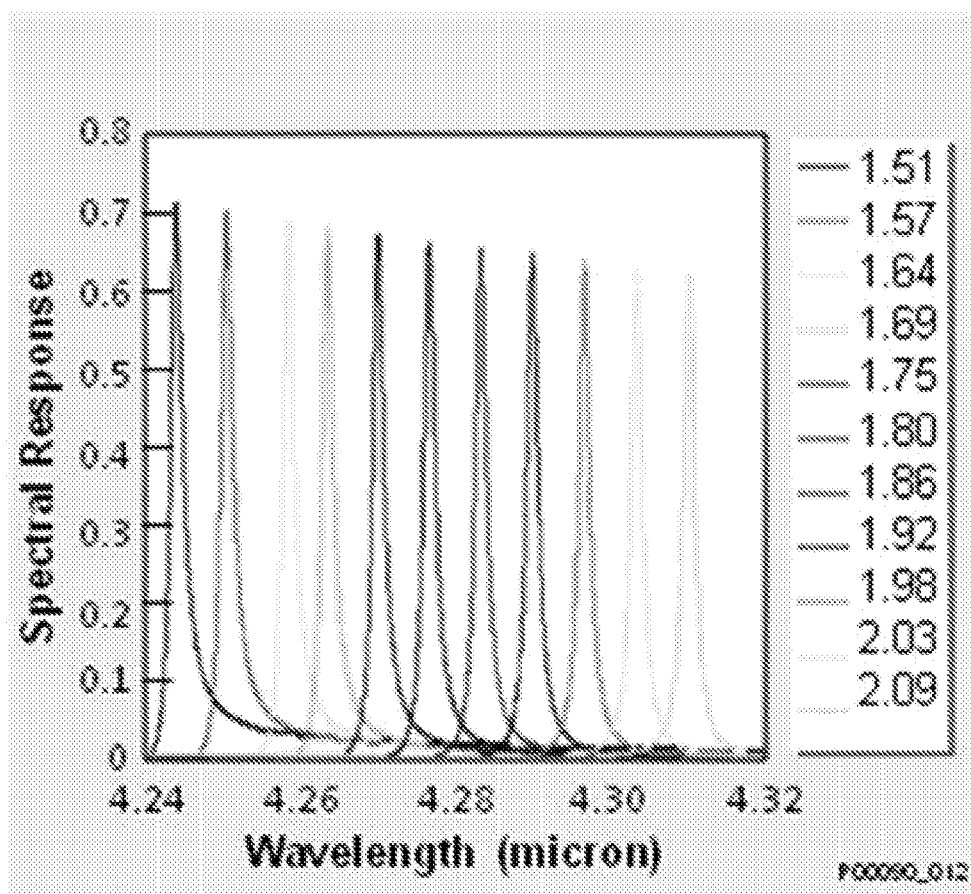

FIGS. 16 and 17 illustrate examples of the spectral response of the reflected electromagnetic radiation of unit cell 10, in accordance with various aspects of the subject technology. As shown in these figures, the center of wavelength of the reflected electromagnetic radiation increases as the permittivity of liquid crystal 36 is increased. In FIG. 16, the permittivity of liquid crystal 36 is indicated by the values of "epi," with each increasing value of epi corresponding to an increasing center of wavelength of the reflected electromagnetic radiation. In FIG. 17, the permittivity of liquid crystal 36 is indicated by values shown to the right of the graph.

In some aspects, the center of wavelength of the reflected electromagnetic radiation may be adjusted by other suitable means. For example, the center of wavelength may be adjusted by adjusting the dimensions of unit cell 10 (e.g., adjusting the dimensions of matrix body 12 and/or inclusion body 14). In one example, longer wavelengths of electromagnetic radiation may be reflected using larger unit cells of the narrow band filter.

Figure 18:
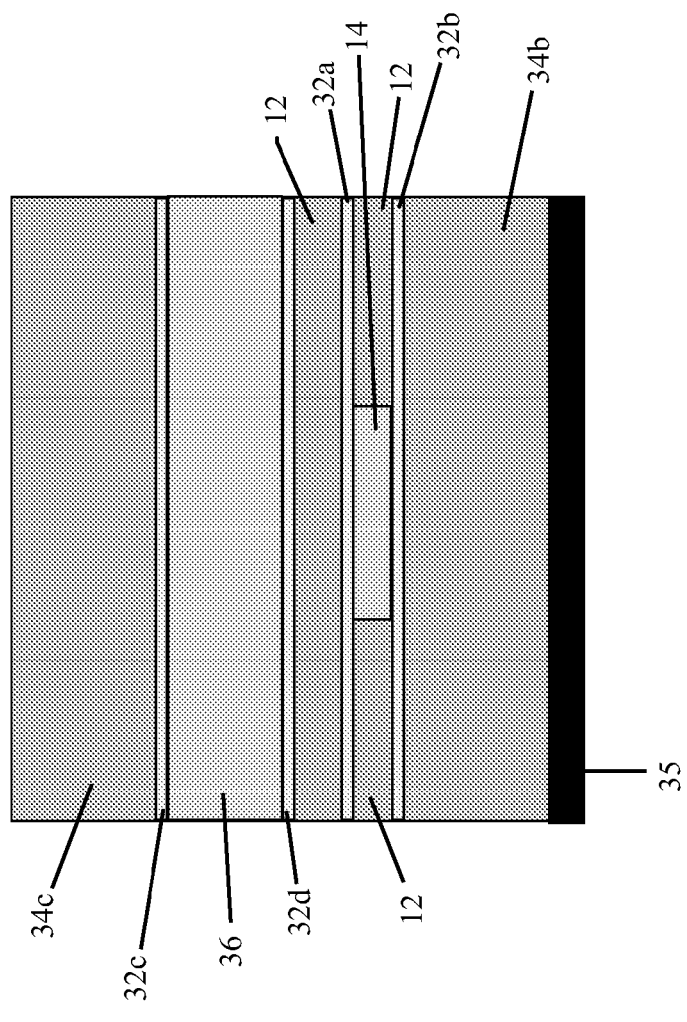
FIG. 18 illustrates a side view of the unit cell, in accordance with various aspects of the subject technology.

FIG. 18 illustrates a side view of unit cell 10, in accordance with various aspects of the subject technology. As shown, electrodes 32c and 32d and liquid crystal 36 are disposed between substrates 34c and matrix body 12. Inclusion body 14 is disposed within matrix body 12 and is coupled between electrodes 32a and 32b. Substrate 34b is disposed between electrode 32b and absorber coating 35. Electrodes 32a, 32b, 32c, and 32d may be used for applying voltage across liquid crystal 36 as well as inclusion body 14, which may also be a liquid crystal. In such a configuration, the bandwidth of the reflected electromagnetic radiation in addition to the center of wavelength of the reflected electromagnetic radiation may be adjusted by adjusting an amount of voltage applied across liquid crystal 36 and/or inclusion body 14.

Figure 19:
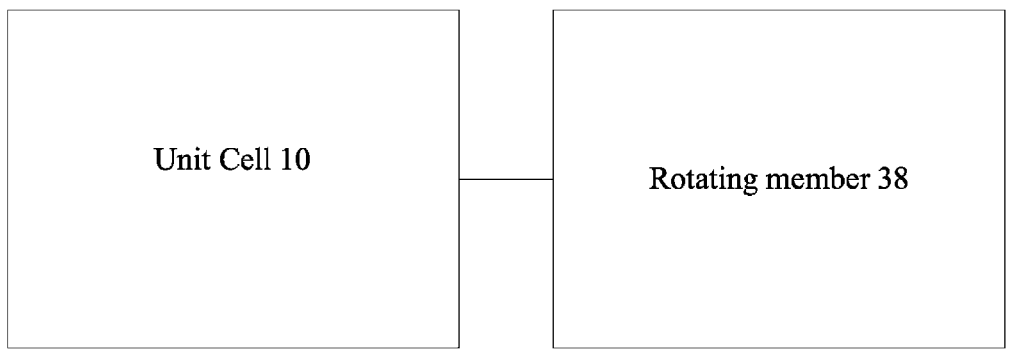
FIG. 19 is a block diagram of a narrow band filter, in accordance with various aspects of the subject technology.

According to various aspects of the subject technology, unit cell 10 of narrow band filter may be rotated in various orientations for different functions. FIG. 19 is a block diagram of narrow band filter 40, in accordance with various aspects of the subject technology. Narrow band filter 40 comprises unit cell 10 and rotating member 38. In some aspects, rotating member 38 is configured to rotate unit cell 10. Rotating member 38 may be any suitable rotating means for rotating unit cell 10. For example, narrow band filter 40 and/or unit cell 10 may be mounted on a rotating stage, rotated by rotating member 38.

In some aspects, rotating member 38 is configured to rotate unit cell 10 about an axis perpendicular to ERFS 28 of inclusion body 14. In some aspects, rotating member 38 is configured to rotate unit cell 10 about an axis parallel to ERFS 28 of inclusion body 14.

Figure 20:
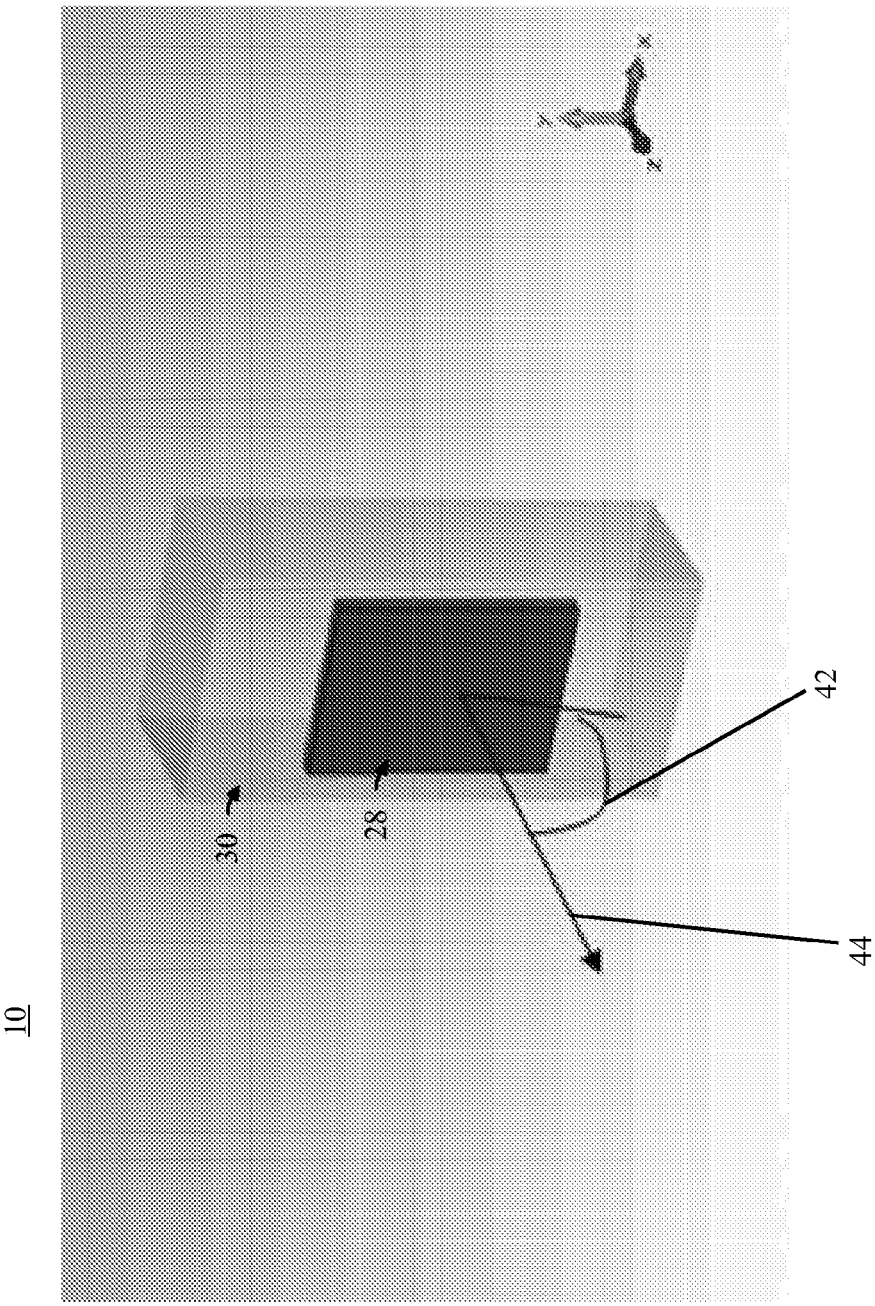
FIG. 20 illustrates a perspective view of the unit cell, in accordance with various aspects of the subject technology.
Figure 21:
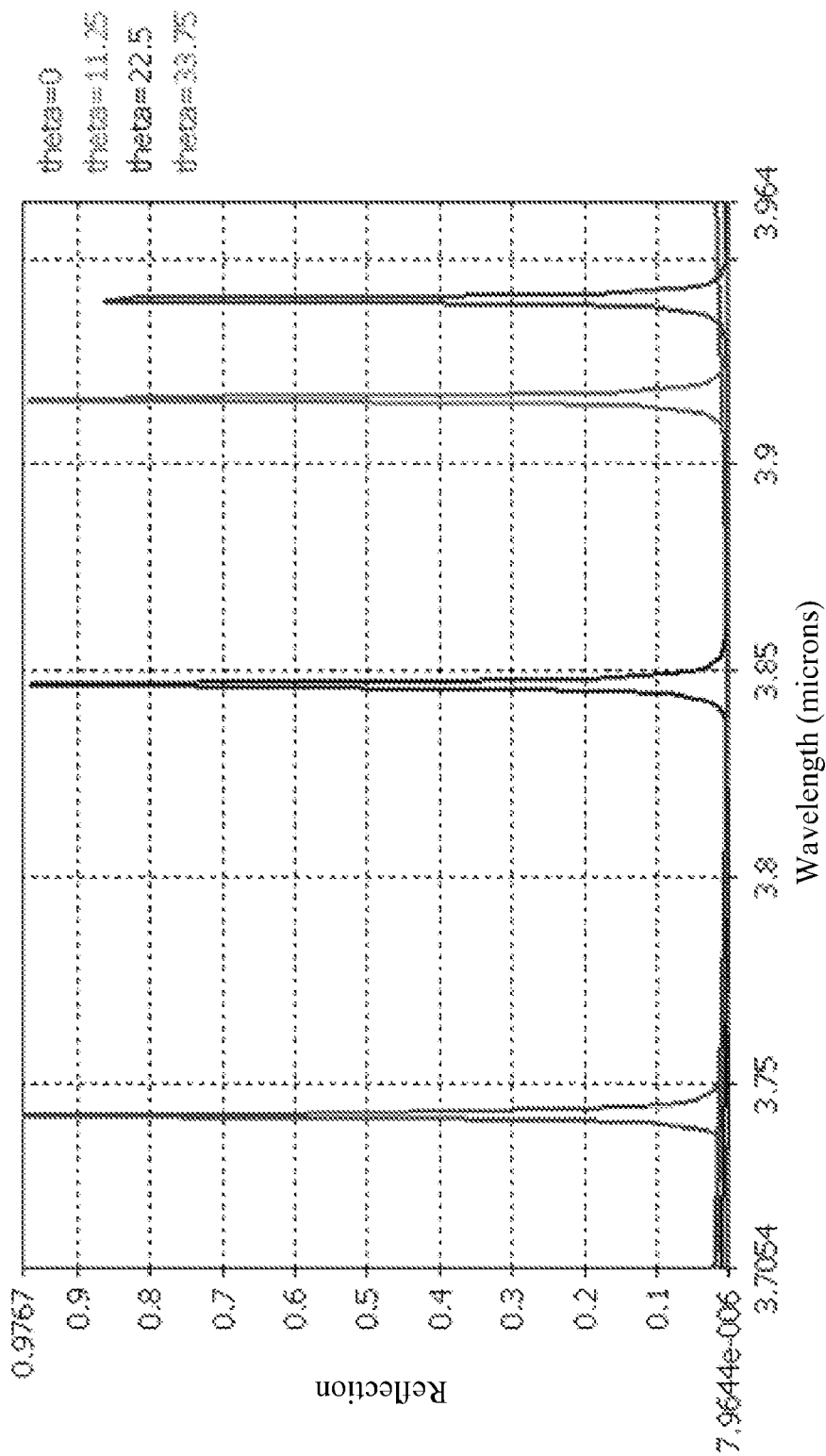
FIG. 21 illustrates examples of the spectral response of the reflected electromagnetic radiation of the unit cell, in accordance with various aspects of the subject technology.

FIG. 20 illustrates a perspective view of unit cell 10, in accordance with various aspects of the subject technology. The center of wavelength of the reflected electromagnetic radiation may be adjusted by varying an angle of incidence of the electromagnetic radiation. For example, axis 44 is normal to ERFS 28 of inclusion body 14 as shown in FIG. 20. By varying the angle of incidence of the electromagnetic radiation from normal to off-normal, as indicated by angle 42, the center of wavelength may be shifted accordingly. Thus, in some aspects, the center of wavelength may be shifted by rotating unit cell 10 using rotating member 38 about an axis parallel to ERFS 28 of inclusion body 14. FIG. 21 illustrates examples of the spectral response of the reflected electromagnetic radiation of unit cell 10, in accordance with various aspects of the subject technology. The values for theta represent angle 42. As shown in FIG. 21, as theta is increased, the center of wavelength is shifted to the left.

According to various aspects of the subject technology, narrow band filter 40 may be polarization dependent or polarization independent. In some aspects, narrow band filter 40 may be configured to provide a same spectral response to transverse electric (TE) mode radiation as transverse magnetic (TM) mode radiation (e.g., making narrow band filter 40 polarization independent). For example, unit cell 10 may be rotated (e.g., using rotating member 38) about an axis perpendicular to ERFS 28 of inclusion body 14 such that unit cell 10 reflects TE mode radiation in a similar manner as TM mode radiation. Unit cell 10 may be rotated about the axis perpendicular to ERFS 28 by 90 degrees to achieve such a result. In some aspects, narrow band filter 40 may comprise a first unit cell and a second unit cell, either one of which may operate similarly as unit cell 10. The first unit cell may be oriented about 90 degrees with respect to the second unit cell about an axis perpendicular to an ERFS of the first unit cell and an ERFS of the second unit cell. Doing so may allow narrow band filter 40 to be polarization independent. Furthermore, in some aspects, a polarization beam splitter may be used to split incoming electromagnetic radiation into TM mode radiation and TE mode radiation, a half waveplate may be used to perform a 90 degree shift on the TM mode radiation or the TE mode radiation, and the TM mode radiation and the TE mode radiation may be rejoined after being reflected by narrow band filter 40.

Figure 22A:
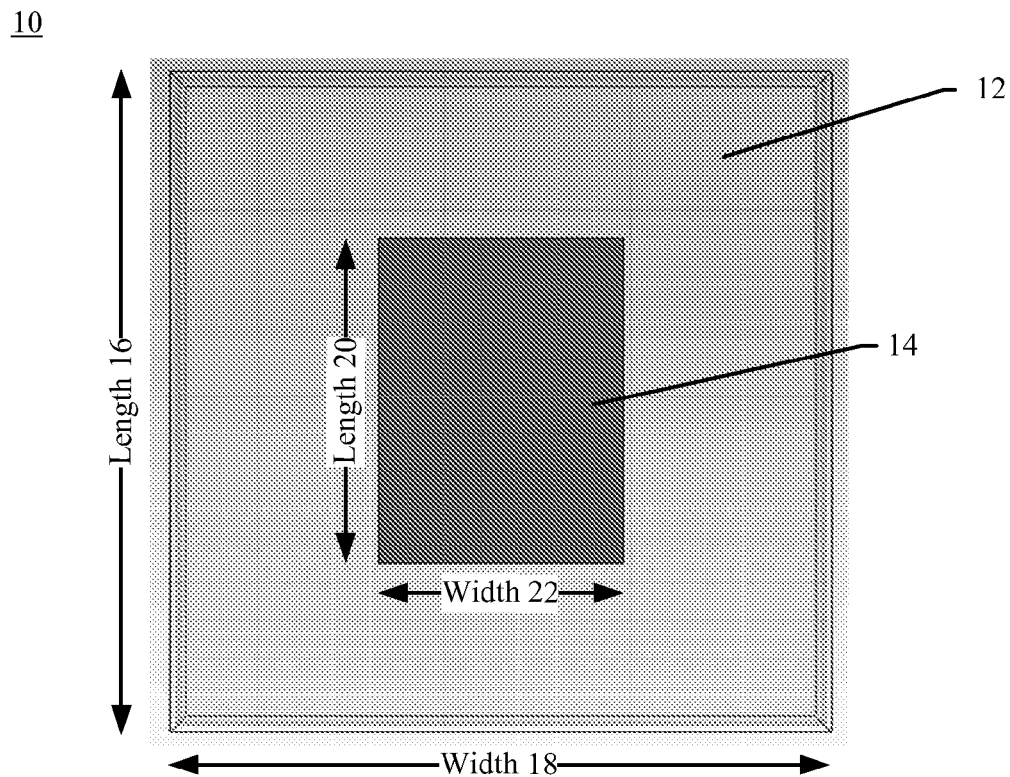
Figure 22B:
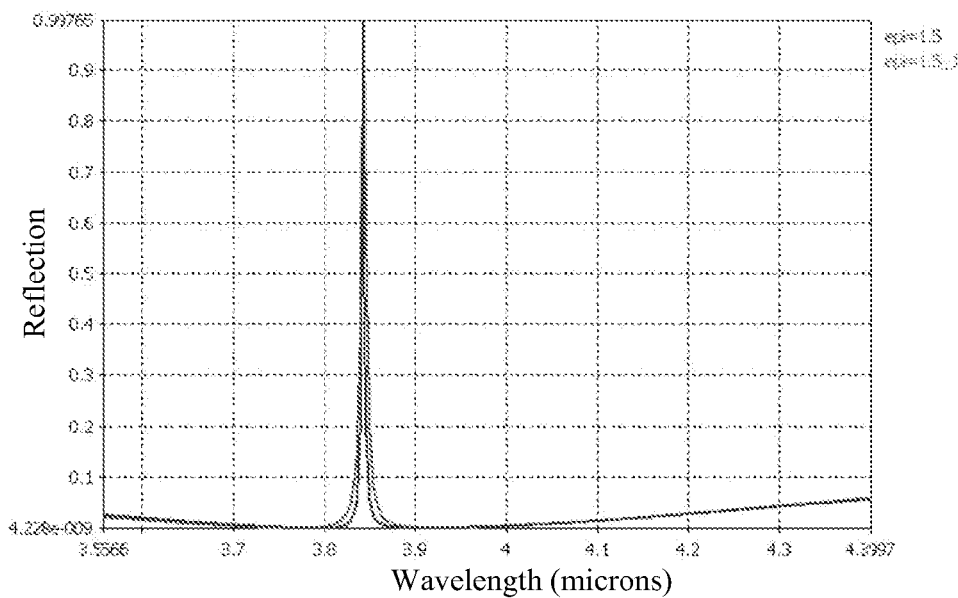
FIG. 22B illustrates an example of the spectral response of the reflected electromagnetic radiation of the unit cell of FIG. 22A, in accordance with various aspects of the subject technology.

FIG. 22A illustrates an example of a polarization independent unit cell configuration for narrow band filter 40, in accordance with various aspects of the subject technology. Length 16 and width 18 of matrix body 12 may be the same. For example, length 16 and width 18 may be 3.04 microns. Length 20 of inclusion body 14 may be 1.52 microns. Width 22 of inclusion body 14 may be 1.14 microns. FIG. 22B illustrates an example of the spectral response of the reflected electromagnetic radiation of unit cell 10 of FIG. 22A, in accordance with various aspects of the subject technology. The inner curve represents TE mode radiation while the outer curve represents TM mode radiation. As shown in FIG. 22A, the spectral responses for both TE mode radiation and TM mode radiation are substantially the same.

Figure 23:
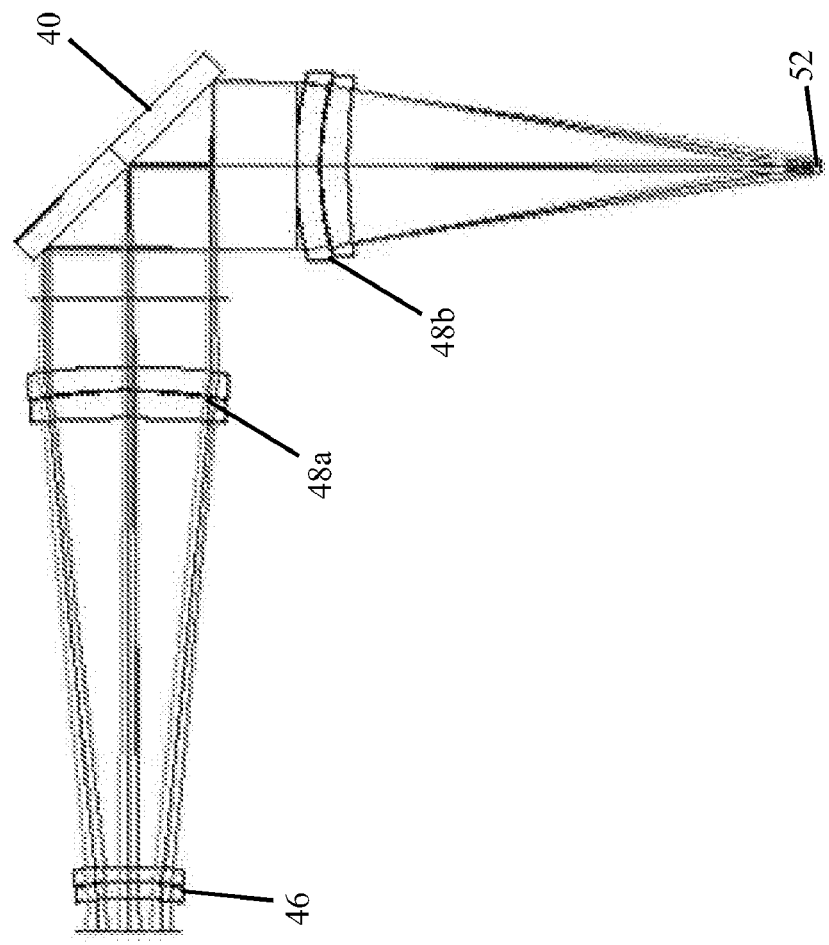
FIG. 23 illustrates an example of a narrow band filter system utilizing the narrow band filter for standoff chemical detection, in accordance with various aspects of the subject technology.

FIG. 23 illustrates an example of a narrow band filter system 50 utilizing narrow band filter 40 for standoff chemical detection, in accordance with various aspects of the subject technology. Narrow band filter system 50 comprises narrow band filter 40, transmissive optics 48a and 48b (e.g., lenses), and detector 52 with cold shield. In some aspects, specific bands of electromagnetic radiation from the sun may be absorbed by chemical species of interest at a standoff distance, such as a standoff distance of about 100 feet. Using the afocal telescope design as shown in FIG. 23, electromagnetic radiation may enter telescope entrance pupil 46 and travel through transmissive optics 48a, and may then be reflected off narrow band filter 40. A narrow band of electromagnetic radiation may then travel through transmissive optics 48b to detector 52 with cold shield. In some aspects, the tunable narrow band may sweep tens of spectral bands of interest. Chemometrics based software may be used for data collected to determine mixed chemical compositions by de-convolving overlapping spectral lines. Some applications of narrow band filter 40 include fence line monitoring to protect industrial releases, fugitive emissions, high traffic area monitoring, CWA emissions, standoff detection, and other suitable applications.

As an example, standoff detection may be implemented with narrow band filter 40 using validated hyperspectral system performance modeling codes and electro-optics systems modeling. For a covert operations scenario in which chemical detection is performed from a 50 meter tower looking down at a 45 degree angle, systems modeling shows that with a 2 nm bandwidth of reflected electromagnetic radiation and a sampling of 20 bands over an integration time of 0.1 seconds, a Formaldehyde signature can be identified with a minimum detection quantity of 57.5 ppm*m, which is suitable for standoff detection.

In some aspects, a chemical detection demonstration at a standoff distance of 2 meters may be performed using vapor generated from a sample of ammonium nitrate, formaldehyde and a common solvent, which are often present in homemade explosives. The highest gas concentration may be located directly at the solid-gas or liquid-gas interface above the sample. The resulting gas mixture may be excited by a Xenon source to simulate the sun, which tails into the infrared. Narrow band filter 40 may be integrated with an ImageIR camera with a sufficient frame rate needed for the demonstration. Narrow band filter 40 may sweep up to 50 spectral bands from 3.8 microns to 4.2 microns. Data collected may use chemometrics based software to determine mixed chemical compositions by de-convolving overlapping spectral lines. The subject technology may be used to address specific clandestine reactants and solvents of interest.

Some approaches do not allow for tunability in the infrared range. Non-tunable narrow band filters in the infrared range, for example, have a maximum resolution of approximately 1 nm. According to various aspects of the subject technology, an order of magnitude improvement is provided over such approaches. According to one approach, a tunable bi-refringent uses solar physics that requires 300 parts, some of which are moving. In accordance with various aspects of the subject technology, this approach may be replaced with a light weight, compact tunable filter system without moving parts. In some aspects, this filter may operate in the visible range.

In some aspects, areas where narrow band filter 40 may be utilized include space and solar physics, improvised explosion detection, chemical warfare agent detection, toxic industrial chemical detection, monitoring of green house gas emission, and small low power gas specific sensors. In some aspects, narrow band filter 40 may use low power (e.g., a few volts to modulate the permittivity of the liquid crystal), may be compact and low weight (e.g., net thickness of narrow band filter 40 may be approximately 6 mm while the lateral dimensions may depend on the aperture of the optical system), and may be suitable for high power applications (e.g., the liquid crystal and an all-dielectric photonic crystal layer can be made from laser harden materials).

Figure 24:
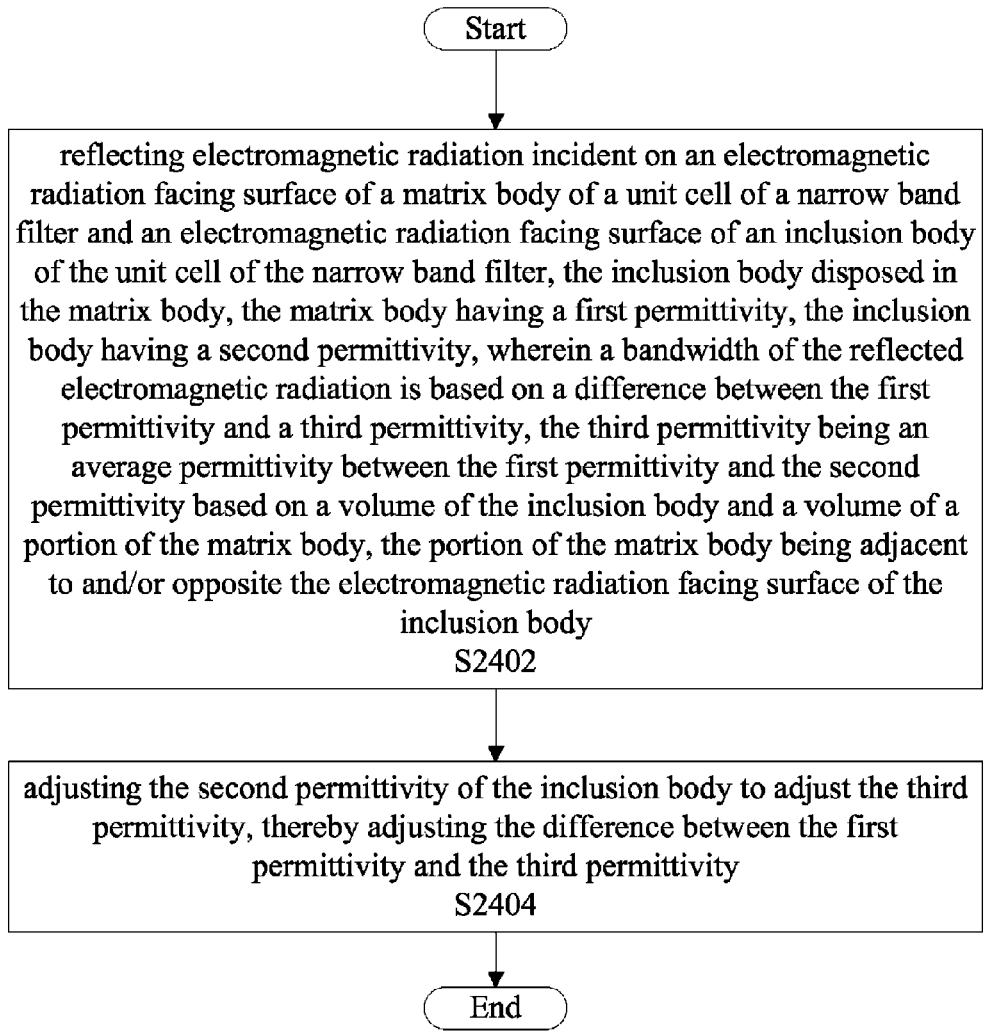
FIG. 24 illustrates an example of a method, in accordance with various aspects of the subject technology.

FIG. 24 illustrates an example of method 2400, in accordance with various aspects of the subject technology. Method 2400 comprises reflecting electromagnetic radiation incident on an electromagnetic radiation facing surface of a matrix body of a unit cell of a narrow band filter and an electromagnetic radiation facing surface of an inclusion body of the unit cell of the narrow band filter. The inclusion body is disposed in the matrix body. The matrix body has a first permittivity. The inclusion body has a second permittivity. A bandwidth of the reflected electromagnetic radiation is based on a difference between the first permittivity and a third permittivity. The third permittivity is an average permittivity between the first permittivity and the second permittivity based on a volume of the inclusion body and a volume of a portion of the matrix body. The portion of the matrix body is adjacent to and/or opposite the electromagnetic radiation facing surface of the inclusion body. Method 2400 also comprises adjusting the second permittivity of the inclusion body to adjust the third permittivity, thereby adjusting the difference between the first permittivity and the third permittivity. In some aspects, method 2400 comprises rotating the unit cell about an axis perpendicular to the electromagnetic radiation facing surface of the inclusion body. In some aspects, method 2400 comprises rotating the unit cell about an axis parallel to the electromagnetic radiation facing surface of the inclusion body.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A unit cell of a narrow band filter, the unit cell comprising:
    a matrix body having a first permittivity;
    an inclusion body disposed in the matrix body, the inclusion body having a second permittivity,
    wherein the matrix body and the inclusion body are configured to reflect electromagnetic radiation incident on an electromagnetic radiation facing surface of the matrix body and an electromagnetic radiation facing surface of the inclusion body,
    wherein a bandwidth of the reflected electromagnetic radiation is based on a difference between the first permittivity and a third permittivity, the third permittivity being an average permittivity between the first permittivity and the second permittivity based on a volume of the inclusion body and a volume of a portion of the matrix body, the portion of the matrix body being adjacent to and/or opposite the electromagnetic radiation facing surface of the inclusion body, and
    wherein the inclusion body is configured such that the second permittivity is adjustable to adjust the third permittivity, thereby adjusting the difference between the first permittivity and the third permittivity.

2. The narrow band filter of claim 1, wherein the matrix body comprises at least one of zinc selenide, zinc sulfide, and germanium.

3. The unit cell of claim 1, wherein the inclusion body comprises silicon dioxide.

4. The unit cell of claim 1, wherein the inclusion body is disposed within a cavity of the matrix body, wherein the electromagnetic radiation facing surface of the inclusion body is aligned with the electromagnetic radiation facing surface of the matrix body.

5. The unit cell of claim 4, wherein an average length of the electromagnetic radiation facing surface of the inclusion body is between 1.52 microns and 1.77 microns, wherein an average width of the electromagnetic radiation facing surface of the inclusion body is between 1.14 microns and 1.52 microns, wherein an average length of the electromagnetic radiation facing surface of the matrix body is between 3.04 microns and 3.54 microns, and wherein an average width of the electromagnetic radiation facing surface of the matrix body is between 1.52 microns and 2.02 microns.

6. The unit cell of claim 4, wherein an average thickness of the inclusion body as measured along an axis perpendicular to the electromagnetic radiation facing surface of the inclusion body is between 250 nanometer and 1 micron, and wherein an average thickness of the matrix body as measured along an axis perpendicular to the electromagnetic radiation facing surface of the matrix body is 1 micron.

7. The unit cell of claim 1, wherein the difference between the first permittivity and the third permittivity is based on a thickness of the inclusion body as measured along an axis perpendicular to the electromagnetic radiation facing surface of the inclusion body relative to a thickness of the matrix body as measured along an axis perpendicular to the electromagnetic radiation facing surface of the matrix body.

8. The unit cell of claim 7, wherein the difference between the first permittivity and the third permittivity is decreased if the thickness of the inclusion body is decreased relative to the thickness of the matrix body, thereby resulting in narrowing the bandwidth of the reflected electromagnetic radiation, and wherein the difference between the first permittivity and the third permittivity is increased if the thickness of the inclusion body is increased relative to the thickness of the matrix body, thereby resulting in broadening the bandwidth of the reflected electromagnetic radiation.

9. The unit cell of claim 1, further comprising:
a first transparent electrode; and
a second transparent electrode,
wherein the inclusion body is disposed between the first transparent electrode and the second transparent electrode,
wherein the inclusion body comprises a liquid crystal, and
wherein the second permittivity is based on an amount of voltage applied across the inclusion body with the first transparent electrode and the second transparent electrode.

10. The unit cell of claim 9, wherein the third permittivity is decreased if the amount of voltage applied across the inclusion body with the first transparent electrode and the second transparent electrode is increased.

11. The unit cell of claim 10, wherein the first permittivity is greater than the third permittivity, wherein the difference between the first permittivity and the third permittivity is increased if the amount of voltage applied across the inclusion body with the first transparent electrode and the second transparent electrode is increased, thereby resulting in broadening the bandwidth of the reflected electromagnetic radiation, and wherein the difference between the first permittivity and the third permittivity is decreased if the amount of voltage applied across the inclusion body with the first transparent electrode and the second transparent electrode is decreased, thereby resulting in narrowing the bandwidth of the reflected electromagnetic radiation.

12. The unit cell of claim 9, wherein at least one of the first transparent electrode and the second transparent electrode is a mid-wave infrared electrode.

13. The unit cell of claim 1, further comprising:
a liquid crystal coupled to the electromagnetic radiation facing surface of the matrix body and the electromagnetic radiation facing surface of the inclusion body;
a first transparent electrode; and
a second transparent electrode,
wherein the liquid crystal is disposed between the first transparent electrode and the second transparent electrode,
wherein a center of wavelength of the reflected electromagnetic radiation is based on an amount of voltage applied across the liquid crystal with the first transparent electrode and the second transparent electrode.

14. The unit cell of claim 13, wherein the center of wavelength of the reflected electromagnetic radiation is increased if the amount of voltage applied across the liquid crystal with the first transparent electrode and the second transparent electrode is decreased, and wherein the center of wavelength of the reflected electromagnetic radiation is decreased if the amount of voltage applied across the liquid crystal with the first transparent electrode and the second transparent electrode is increased.

15. The unit cell of claim 1, wherein the reflected electromagnetic radiation is within an infrared portion of the electromagnetic spectrum.

16. A narrow band filter comprising:
a first unit cell comprising:
a first matrix body having a first permittivity; and
a first inclusion body disposed in the first matrix body, the first inclusion body having a second permittivity,
wherein the first matrix body and the first inclusion body are configured to reflect electromagnetic radiation incident on an electromagnetic radiation facing surface of the first matrix body and an electromagnetic radiation facing surface of the first inclusion body; and
a rotating member configured to rotate the first unit cell,
wherein a bandwidth of the reflected electromagnetic radiation is based on a difference between the first permittivity and a third permittivity, the third permittivity being an average permittivity between the first permittivity and the second permittivity based on a volume of the first inclusion body and a volume of a portion of the first matrix body, the portion of the first matrix body being adjacent to and/or opposite the electromagnetic radiation facing surface of the first inclusion body, and
wherein the first inclusion body is configured such that the second permittivity is adjustable to adjust the third permittivity, thereby adjusting the difference between the first permittivity and the third permittivity.

17. The narrow band filter of claim 16, wherein the rotating member is configured to rotate the first unit cell about an axis perpendicular to the electromagnetic radiation facing surface of the first inclusion body.

18. The narrow band filter of claim 16, wherein the rotating member is configured to rotate the first unit cell about an axis parallel to the electromagnetic radiation facing surface of the first inclusion body.

19. The narrow band filter of claim 16, further comprising a second unit cell coupled to the first unit cell, the second unit cell comprising:
a second matrix body having a fourth permittivity;
a second inclusion body disposed in the second matrix body, the second inclusion body having a fifth permittivity,
wherein the second matrix body and the second inclusion body are configured to reflect electromagnetic radiation incident on an electromagnetic radiation facing surface of the second matrix body and an electromagnetic radiation facing surface of the second inclusion body,
wherein a bandwidth of the reflected electromagnetic radiation of the second matrix body and the second inclusion body is based on a difference between the fourth permittivity and a sixth permittivity, the sixth permittivity being an average permittivity between the fourth permittivity and the fifth permittivity based on a volume of the second inclusion body and a volume of a portion of the second matrix body, the portion of the second matrix body being adjacent to and/or opposite the electromagnetic radiation facing surface of the second inclusion body, and
wherein the second inclusion body is configured such that the fifth permittivity is adjustable to adjust the sixth permittivity, thereby adjusting the difference between the fourth permittivity and the sixth permittivity, and
wherein the second unit cell is oriented about ninety degrees with respect to the first unit cell about an axis perpendicular to the electromagnetic radiation facing surface of the first matrix body, the electromagnetic radiation facing surface of the first inclusion body, the electromagnetic radiation facing surface of the second matrix body, and the electromagnetic radiation facing surface of the second inclusion body.

20. A method comprising:

reflecting electromagnetic radiation incident on an electromagnetic radiation facing surface of a matrix body of a unit cell of a narrow band filter and an electromagnetic radiation facing surface of an inclusion body of the unit cell of the narrow band filter, the inclusion body disposed in the matrix body, the matrix body having a first permittivity, the inclusion body having a second permittivity, wherein a bandwidth of the reflected electromagnetic radiation is based on a difference between the first permittivity and a third permittivity, the third permittivity being an average permittivity between the first permittivity and the second permittivity based on a volume of the inclusion body and a volume of a portion of the matrix body, the portion of the matrix body being adjacent to and/or opposite the electromagnetic radiation facing surface of the inclusion body; and adjusting the second permittivity of the inclusion body to adjust the third permittivity, thereby adjusting the difference between the first permittivity and the third permittivity.

* * * * *